(12) United States Patent
Hirato et al.

(10) Patent No.: US 9,482,906 B2
(45) Date of Patent: Nov. 1, 2016

(54) LIQUID CRYSTAL DISPLAY

(71) Applicant: Sharp Kabushiki Kaisha, Osaka-shi, Osaka (JP)

(72) Inventors: Shinichi Hirato, Osaka (JP); Nobuhiro Waka, Osaka (JP); Masayuki Tsuji, Osaka (JP); Masami Ogura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 28 days.

(21) Appl. No.: 14/653,950

(22) PCT Filed: Dec. 20, 2013

(86) PCT No.: PCT/JP2013/084223
§ 371 (c)(1),
(2) Date: Jun. 19, 2015

(87) PCT Pub. No.: WO2014/103917
PCT Pub. Date: Jul. 3, 2014

(65) Prior Publication Data
US 2015/0316808 A1 Nov. 5, 2015

(30) Foreign Application Priority Data

Dec. 28, 2012 (JP) ................................. 2012-287658

(51) Int. Cl.
*G02F 1/1345* (2006.01)
*G02F 1/1339* (2006.01)
*G02F 1/1333* (2006.01)
*G02F 1/1337* (2006.01)

(52) U.S. Cl.
CPC ..... *G02F 1/13394* (2013.01); *G02F 1/133345* (2013.01); *G02F 1/133371* (2013.01); *G02F 1/133784* (2013.01); *G02F 2001/13398* (2013.01)

(58) Field of Classification Search
CPC ................... G02F 1/133371; G02F 1/133784; G02F 1/133345; G02F 1/13394; G02F 2001/13398
See application file for complete search history.

(56) References Cited

U.S. PATENT DOCUMENTS

| 2004/0246432 A1* | 12/2004 | Tsuchiya | H01L 27/3246 349/187 |
|---|---|---|---|
| 2005/0052607 A1 | 3/2005 | Mori et al. | |
| 2013/0128207 A1* | 5/2013 | Nakano | G02F 1/1343 349/141 |
| 2014/0232975 A1* | 8/2014 | Ohira | G02F 1/136286 349/138 |

FOREIGN PATENT DOCUMENTS

| JP | 2005-107494 A | 4/2005 |
| JP | 2009-042656 A | 2/2009 |
| JP | 2009-080200 A | 4/2009 |

\* cited by examiner

*Primary Examiner* — Hoan C Nguyen
(74) *Attorney, Agent, or Firm* — Keating & Bennett, LLP

(57) ABSTRACT

The present invention provides a liquid crystal display that can suppress generation of defects even when attachment misalignment of substrates is generated, and that is advantageous in providing high definition. The present invention relates to a liquid crystal display including: a first substrate; a second substrate; and a liquid crystal layer sandwiched between the first and second substrates, the first substrate including an interlayer insulating film in which multiple openings are formed on the same straight line, the interlayer insulating film including multiple curved portions each provided with a curved upper surface, the curved portions each positioned between two adjacent openings, the second substrate provided with a spacer facing at least one of the curved portions, the spacer being longer in a first direction than in a second direction wherein the first direction is a direction parallel to the straight line, and the second direction is orthogonal to the first direction.

15 Claims, 16 Drawing Sheets

LIQUID CRYSTAL DISPLAY

TECHNICAL FIELD

The present invention relates to a liquid crystal display. More specifically, the present invention relates to a liquid crystal display suitable as a high definition display.

BACKGROUND ART

Flat-panel displays have been actively developed in these years, and in particular, liquid crystal displays have been drawing attention because these displays have advantages of light weight, thin profile, and low power consumption, for example. Also, in these days, mainly portable electronic apparatuses such as smartphones and tablet PCs have been desired to exhibit high definition and high viewing angle characteristics from the viewpoint of improving display qualities, and to exhibit even lower power consumption so as to lengthen the battery life. For example, a super-high definition has been desired which is from 200 ppi to higher than 300 ppi. In order to also achieve low power consumption, an even higher aperture ratio of pixels has been desired.

A liquid crystal display is provided with a liquid crystal layer sealed between a pair of substrates. In order to maintain the thickness of the liquid crystal layer (what is called a cell gap) to a uniform value, Patent Literature 1, for example, discloses a technique of providing pillar-shaped spacers between the pair of substrates. It is important to maintain a uniform thickness of the liquid crystal layer so as not to decrease the display qualities.

For example, Patent Literature 2 discloses, as a technique of maintaining the thickness of the liquid crystal layer at a constant value, a display panel including a first substrate; a second substrate arranged to face the first substrate; a display medium layer arranged between the first substrate and the second substrate; and a display region formed by multiple pixels. In the display panel, the first substrate is provided with an interlayer insulating film with holes open on the second substrate side for the individual pixels; the second substrate is provided with multiple pillar-shaped spacers that define the thickness of the display medium layer; the pillar-shaped spacers are formed to have a maximum width in a cross section parallel to the second substrate which is greater than the width of the openings of the holes in at least one direction parallel to the second substrate; and various positional relations are provided for the pillar-shaped spacers and the holes arranged closest to the respective individual pillar-shaped spacers.

Also, Patent Literature 3, for example, discloses a liquid crystal display that includes a pair of substrates attached to one another with pillar-shaped spacers in between, a liquid crystal layer sandwiched between the substrates, and provides display using multiple pixels. In the liquid crystal display, the pixels include the pillar-shaped spacers and contact holes, and the pillar-shaped spacers include regions overlapping the contact holes and regions not overlapping the contact holes in a cross section parallel to the substrates.

CITATION LIST

Patent Literature

Patent Literature 1: JP 2009-42656 A
Patent Literature 2: JP 2009-80200 A
Patent Literature 3: JP 2005-107494 A

SUMMARY OF INVENTION

Technical Problem

A liquid crystal display of Comparative Embodiment 1, on which the present inventors have made studies, is described. FIG. 25 is a schematic view illustrating a cross-sectional structure of the liquid crystal display of Comparative Embodiment 1. The liquid crystal display of Comparative Embodiment 1 includes a liquid crystal panel 101, and a backlight (not illustrated) arranged at the rear side of the liquid crystal panel. The liquid crystal panel 101 includes an array substrate 110, a counter substrate 140, and a liquid crystal layer 103 sealed between the substrates 110 and 140 with a sealing material (not illustrated).

The array substrate 110 includes an insulating substrate 111, a base insulating film 112 arranged on the insulating substrate 111, multiple semiconductor layers 116 arranged on the base insulating film 112, a gate insulating film 117 covering the semiconductor layers 116, multiple gate bus lines (not illustrated) and multiple gate electrodes 118 arranged on the gate insulating film 117, an interlayer insulating film 122 covering the gate bus lines and the gate electrodes 118, multiple source bus lines (not illustrated), multiple source electrodes 119, and multiple drain electrodes 120 arranged on the interlayer insulating film 122, an interlayer insulating film 123 covering the source bus lines, the source electrodes 119 and the drain electrodes 120, multiple pixel electrodes 121 arranged on the interlayer insulating film 123, and an alignment film (not illustrated) covering the pixel electrodes 121. The interlayer insulating film 123 is formed from a photosensitive resin film by the photolithography technology, and the interlayer insulating film 123 is provided with multiple openings 136 each functioning as a contact hole in the respective sub-pixels. The pixel electrodes 121 are electrically connected to the respective drain electrodes 120 through the openings 136.

The counter substrate 140 includes an insulating substrate 141, black matrix (BM) 142 and color filters (not illustrated) formed on the insulating substrate 141, an overcoat film 143 covering these components, a common electrode 144 arranged on the overcoat film 143, pillar-shaped spacers 145 formed on the common electrode 144, and an alignment film (not illustrated) formed on the common electrode 144 and the spacers 145. The spacers 145 are formed from a photosensitive resin film by the photolithography technology.

The thickness of the liquid crystal layer 103 is maintained uniformly when the array substrate 110 and the counter substrate 140 are in contact with one another in portions where the spacers 145 are formed.

Here, in order to achieve a high definition and a high aperture ratio, the arrangement positions of the spacers 145 and the arrangement positions of the openings 136 of the interlayer insulating film 123 are very important. When the positions are on the same line, the highest aperture ratio can be achieved. This is because the openings 136 and the spacers 145 both are the causes of light leakage in a liquid crystal mode employing a normally black mode such as the in-plane switching (IPS) mode and the fringe field switching (FFS) mode, and thus need to be covered by the BM142. Also, an increase in the definition raises the need for reducing the size of the spacers 145. However, reduction in the size of the spacers 145 causes the end portions of the spacers 145 to be round even if the spacers 145 are designed to have a pillar shape such as a cylinder, which gives each of the spacers 145 only one top point.

Usually, the side portions (portions adjacent to the openings 136) of the interlayer insulating film 123 each have a forward tapered shape, and as the pitch of the openings 136 is reduced, the distance between two side portions is shortened. Also, if the side portions each are steep, ink for alignment film formation may rise in the openings 136 due to the surface tension, which inhibits uniform application of the ink, causing the film thickness of the alignment film to be uneven. As described above, in order to achieve high definition while preventing unevenness in the film thickness of the alignment film, the distance between adjacent two openings 136 needs to be small, and also the inclination of the side surfaces of the interlayer insulating film 123 needs to be small. As a result, the surface of the interlayer insulating film 123 is rounded between adjacent two openings 136.

The present inventors have found that attachment misalignment of the array substrate 110 and the counter substrate 140 in the liquid crystal display of Comparative Embodiment 1 causes defects such as those described below.

Since the surface of the interlayer insulating film 123 and the end portions of the spacers 145 are both round and they are in contact with one another at points, attachment misalignment of the substrates 110 and 140 as illustrated in FIG. 26 makes the gap between the substrate 110 and the substrate 140 maintained by the spacers 145 small, and thus the capacity of the gap between the substrates is small. The volume of the liquid crystal material supplied between the substrates 110 and 140 is set to a predetermined volume regardless of generation of attachment misalignment. Accordingly, when a liquid crystal material in a predetermined volume is supplied to the cell in which attachment misalignment has been generated, the gap formed between the substrates 110 and 140 by the spacers 145 is filled with an excessive amount of the liquid crystal material. Such a liquid crystal material in an excessive amount is likely to be concentrated in the region around the sealing material where the internal stress tends to be concentrated, and thus the liquid crystal layer 103 tends to have an uneven thickness around the sealing material, causing display unevenness. For example, white display unevenness occurs, or yellow display unevenness occurs in the case where a liquid crystal material with high dielectric anisotropy is used as in the case of an IPS mode.

In the case where attachment misalignment of the substrates 110 and 140 is generated, the elasticity (restoring force) of the spacers 145 is distributed as illustrated in FIG. 27, and the elasticity components in the thickness direction of the liquid crystal layer 103 are small compared to the case where no attachment misalignment is generated as illustrated in FIG. 28. Hence, when load is temporarily applied to the surface of the panel by, for example, pushing the surface of the panel, it takes time for the liquid crystal layer 103 to have the original thickness. Therefore, the liquid crystal panel 101 of Comparative Embodiment 1 is not suitable as a panel provided with a touch panel system.

The display panel of Patent Literature 2 requires various positional relations for the pillar-shaped spacers and the holes arranged closest to the respective individual pillar-shaped spacers. However, in the case of an ultra-high definition panel with a definition higher than 200 ppi, the pillar-shaped spacers and the holes are required to be as small as possible. It is also difficult to provide multiple positional relations between the pillar-shaped spacers and the holes if the aperture ratio is increased as much as possible. Therefore, the display panel of Patent Literature 2 can still be improved from the viewpoint of achieving an even higher definition.

Patent Literature 3 teaches that the aperture ratio can be increased by providing the pillar-shaped spacers the regions overlapping the contact holes and the regions not overlapping the contact holes. However, the interlayer insulating film around the contact holes may have a forward tapered shape as described above. Therefore, when attachment misalignment of the substrates is generated, the thickness of the liquid crystal layer may be uneven, or the amount of the liquid crystal material may be insufficient to generate air bubbles. Here, if the size of the pillar-shaped spacers is increased in consideration of these defects, the aperture ratio decreases.

The present invention has been made in view of the above state of the art, and aims to provide a liquid crystal display that is capable of suppressing generation of defects even when attachment misalignment of the substrates is generated, and that is advantageous in achieving high definition.

Solution to Problem

One aspect of the present invention may be a liquid crystal display including:
a first substrate;
a second substrate; and
a liquid crystal layer sandwiched between the first and second substrates,
the first substrate including an interlayer insulating film in which multiple openings are formed on the same straight line,
the interlayer insulating film including multiple curved portions each provided with a curved upper surface,
the curved portions each positioned between two adjacent openings,
the second substrate provided with a spacer facing at least one of the curved portions,
the spacer being longer in a first direction than in a second direction wherein the first direction is a direction parallel to the straight line, and the second direction is orthogonal to the first direction.

Hereinafter, such a liquid crystal display is also referred to as the liquid crystal display of the present invention.

Preferred embodiments of the liquid crystal display of the present invention are described below. Here, the following preferred embodiments may be appropriately combined with one another, and any combination of at least two of the following preferred embodiments is also one of the preferred embodiments.

The spacer may be pushed against the N number of consecutive curved portions of the multiple curved portions, wherein N is an integer of 2 or greater.

The liquid crystal display of the present invention may satisfy the relation $(N-1) \times L + 2 \times \Delta x \leq X$, wherein X represents a length of the spacer in the first direction, $\Delta x$ represents attachment accuracy of the first substrate and the second substrate in the first direction, and L represents a pitch of the N number of the openings in the first direction.

The liquid crystal display of the present invention may satisfy the relation $X \leq (N+1) \times L - 2 \times \Delta x$, wherein X represents a length of the spacer in the first direction, $\Delta x$ represents attachment accuracy of the first substrate and the second substrate in the first direction, and L represents a pitch of the N number of the openings in the first direction.

The spacer may be pushed against only one curved portion of the multiple curved portions.

The liquid crystal display of the present invention may satisfy the relation $2 \times \Delta x \leq X$, wherein X represents a length of the spacer in the first direction, and $\Delta x$ represents attachment accuracy of the first substrate and the second substrate in the first direction.

The liquid crystal display of the present invention may satisfy the relation $X \leq 2 \times L - 2 \times \Delta x$, wherein X represents a length of the spacer in the first direction, $\Delta x$ represents attachment accuracy of the first substrate and the second substrate in the first direction, and L represents a pitch of the two openings in the first direction.

The liquid crystal display of the present invention may satisfy the relation $2 \times \Delta y \leq Y$, wherein Y represents a length of the spacer in the second direction, and $\Delta y$ represents attachment accuracy of the first substrate and the second substrate in the second direction.

The second substrate may further include a black matrix, the spacer may be arranged on the black matrix, and the liquid crystal display of the present invention may satisfy the relation of $Y \leq B$, wherein B represents the width of the black matrix in the second direction, and Y represents the length of the spacer in the second direction.

The interlayer insulating film may further include two protruded portions, the spacer may be arranged between the two protruded portions in the second direction, and the liquid crystal display of the present invention may satisfy the relation $Y \leq M - 2 \times \Delta y$, wherein Y represents a length of the spacer in the second direction, M represents a distance in the second direction between two end portions of the two protruded portions facing each other, and $\Delta y$ represents attachment accuracy of the first substrate and the second substrate in the second direction.

The spacer may be provided with a flat upper surface, and the upper surface may exhibit a height deviation of 0.05 µm or less.

The spacer in a planar shape may have a center and/or a center of gravity on the straight line in a plan view.

The spacer in a planar shape may have a center and/or a center of gravity that is/are not on the straight line in a plan view.

In a plan view, the spacer may have an n-sided polygonal shape, an oval shape, a circular shape, or a shape that is a combination of multiple shapes.

In a plan view, the spacer may have a shape that is a combination of the multiple shapes partially overlapping each other.

In a plan view, the spacer may have a shape that is a combination of the multiple shapes being apart from each other.

Advantageous Effects of Invention

The present invention can provide a liquid crystal display that can suppress generation of defects even when attachment misalignment of substrates is generated, and that is advantageous in providing high definition.

DESCRIPTION OF EMBODIMENTS

The present invention will be described in more detail below with reference to the drawings based on embodiments which, however, are not intended to limit the scope of the present invention.

The n-sided polygonal shape herein includes not only shapes identified with the ideal n-sided polygonal shape but also shapes obtained by rounding the corners of the ideal n-sided polygonal shape. The same applies to the case where in a combination of multiple shapes, the multiple shapes include an n-sided polygonal shape, and the n-sided polygonal shape includes not only shapes identified with the ideal n-sided polygonal shape but also shapes obtained by rounding the corners of the ideal n-sided polygonal shape.

Also, a parallelogram herein means a quadrilateral with two sets of parallel opposite sides, of which one set is of long sides and the other set is of short sides. The parallelogram herein, however, excludes a rhombus that is a quadrilateral with two sets of parallel opposite sides, of which all the four sides have the same length.

Embodiment 1

Figure 1:
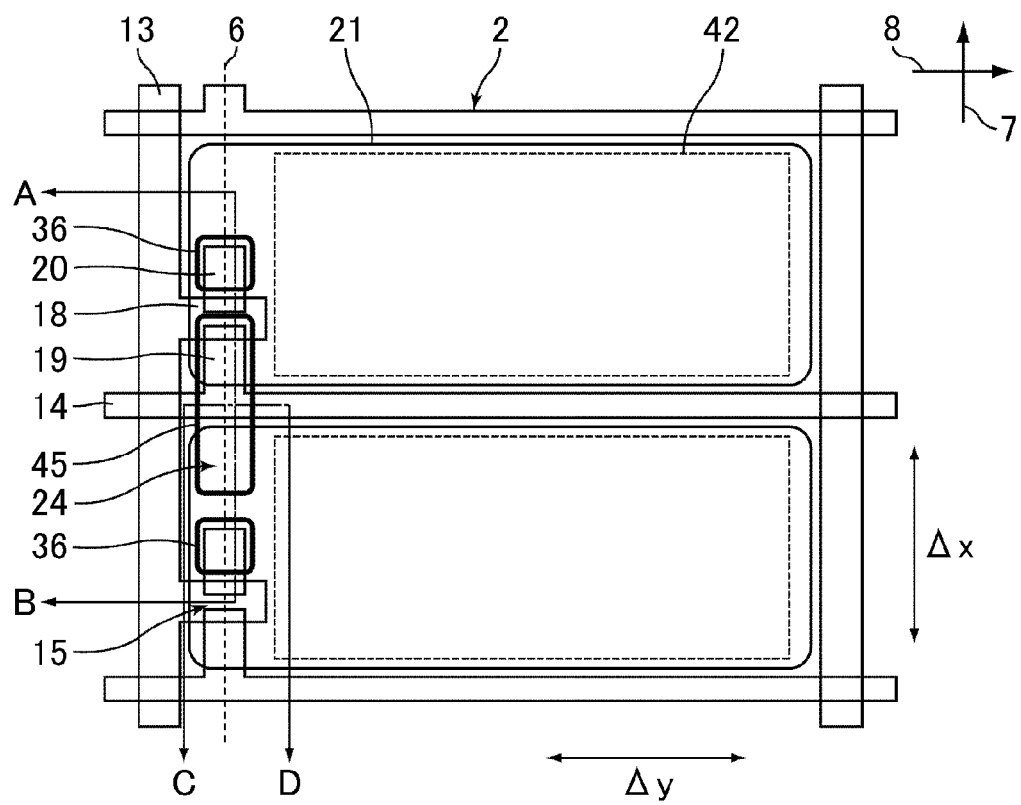
FIG. 1 is a schematic plan view illustrating a structure of a liquid crystal display of Embodiment 1.
Figure 2:
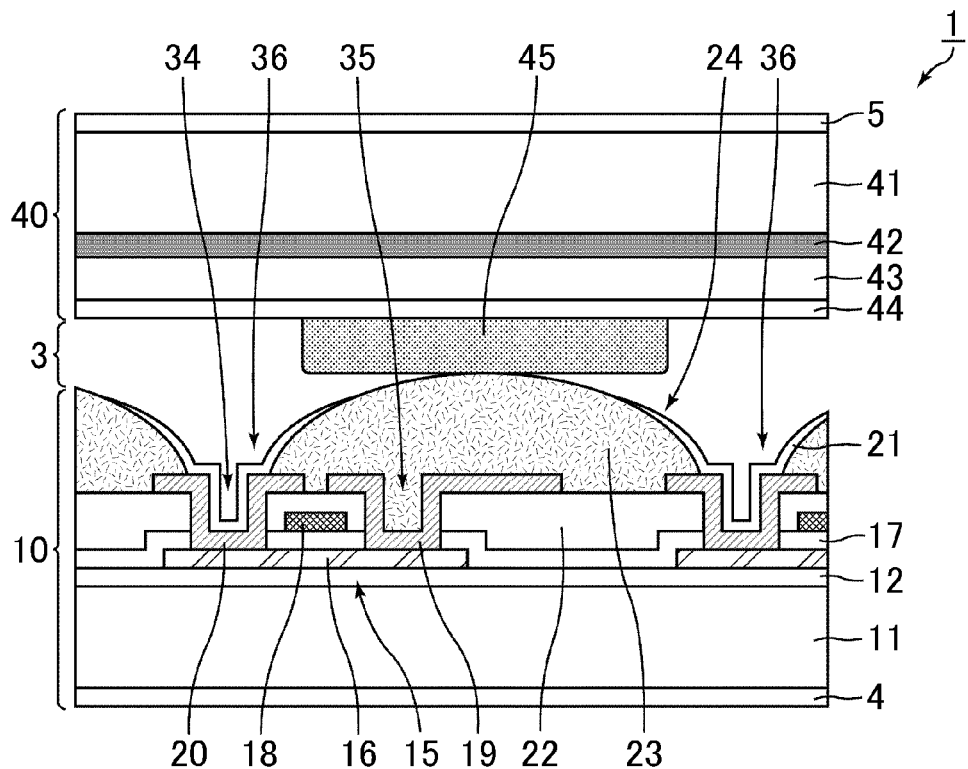
FIG. 2 is a schematic view illustrating a cross-sectional structure of the liquid crystal display of Embodiment 1, the cross-sectional structure taken along the line A-B in FIG. 1.
Figure 3:
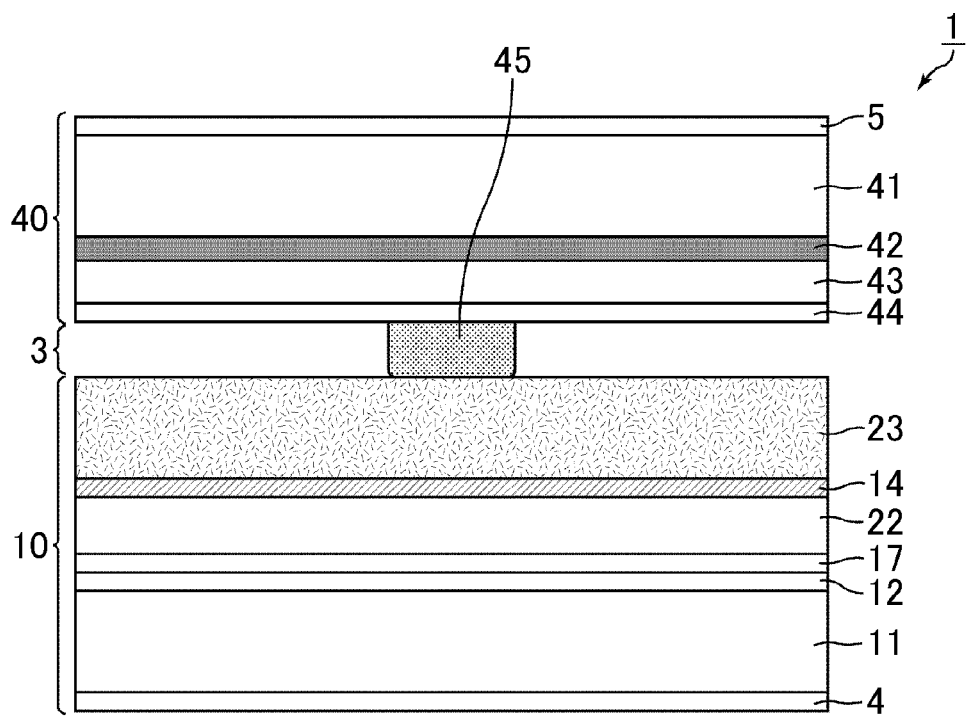
FIG. 3 is a schematic view illustrating a cross-sectional structure of an array substrate in the liquid crystal display of Embodiment 1, the cross-sectional structure taken along the line C-D in FIG. 1.
Figure 12:
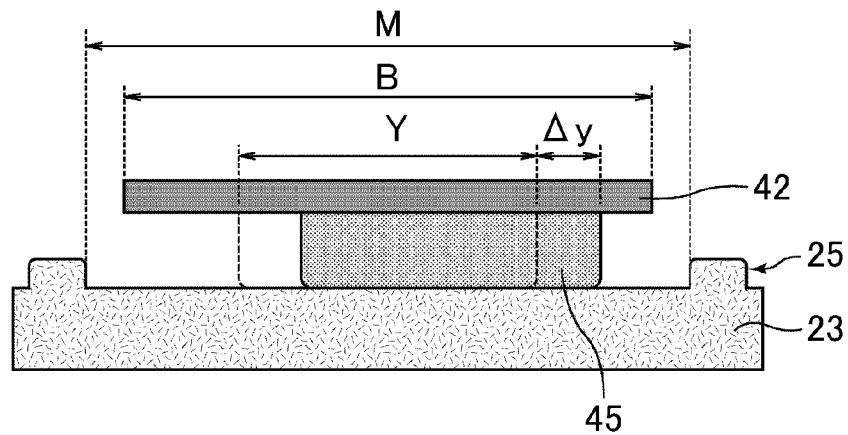
FIG. 12 is a schematic cross-sectional view illustrating a spacer, a black matrix, and an interlayer insulating film in Embodiment 1.
Figure 13:
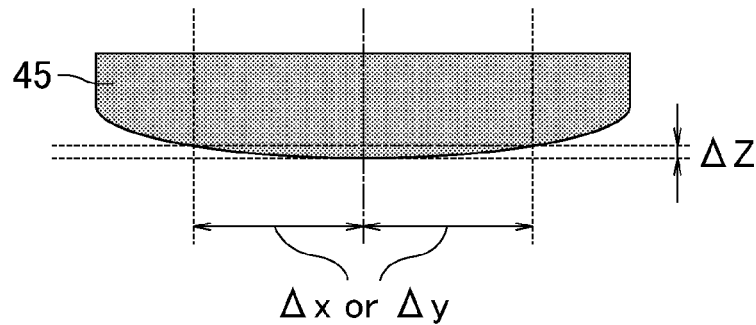
FIG. 13 is a schematic cross-sectional view illustrating a spacer in Embodiment 1.

FIG. 1 and FIGS. 4 to 6 are schematic plan views illustrating the structures of the liquid crystal display of Embodiment 1. FIG. 2 is a schematic view illustrating a cross-sectional structure of the liquid crystal display of Embodiment 1, the cross-sectional structure taken along the line A-B in FIG. 1. FIG. 3 is a schematic view illustrating a cross-sectional structure of an array substrate in the liquid crystal display of Embodiment 1, the cross-sectional structure taken along the line C-D in FIG. 1. FIG. 8 to FIG. 11 are schematic cross-sectional views illustrating a spacer, and curved portion(s) of an interlayer insulating film in Embodiment 1. FIG. 12 is a schematic cross-sectional view illustrating a spacer, a black matrix, and an interlayer insulating film in Embodiment 1. FIG. 13 is a schematic cross-sectional view illustrating a spacer in Embodiment 1. Here, FIG. 2 and FIG. 3 illustrate cross sections parallel to the respective first direction and second direction described later.

The liquid crystal display of Embodiment 1 is a transmissive liquid crystal display with an active matrix driving method, and includes a liquid crystal panel 1 and a backlight (not illustrated) arranged at the rear side of the liquid crystal panel. The liquid crystal panel 1 includes an array substrate 10 corresponding to the first substrate, a counter substrate 40 corresponding to the second substrate and arranged to face the array substrate 10, and a liquid crystal layer 3 sealed between the substrates 10 and 40 by a sealing material (not illustrated). The liquid crystal display of the present embodiment includes a display area (not illustrated) that displays images. The display area is formed from multiple sub-pixels 2 arranged in a matrix. Here, multiple (e.g. three of red, green, blue) sub-pixels 2 constitute one pixel. The sub-pixels and pixels are arranged in the row direction (right-left direction) and the column direction (up-down direction) in the display area.

The array substrate 10 includes an insulating substrate 11 having light transmittance, such as a glass plate and a quartz plate. On the insulating substrate 11 in the display area, multiple pixel electrodes 21 each arranged in a sub-pixel 2, multiple gate bus lines 13 each extending in the column direction, multiple source bus lines 14 each extending in the row direction, and multiple switching elements each arranged near an intersection of one of the source bus lines 14 and the corresponding gate bus line 13 in each sub-pixel 2. Each switching element is formed by, for example, a thin-film transistor (TFT) 15.

On the insulating substrate 11, a base insulating film 12 is formed. On the base insulating film 12, a semiconductor layer 16 of each TFT 15 is formed. The semiconductor layer 16 can be formed from a material such as a group 14 element semiconductor (e.g. polysilicon, amorphous silicon) or an oxide semiconductor, for example. The crystallinity of the semiconductor layer 16 is not particularly limited, and the semiconductor layer 16 may be monocrystalline, polycrystalline, amorphous, or microcrystalline, or may have two or more of these crystallinities. Here, the microcrystalline refers to a state in which both amorphous and polycrystalline materials are contained.

The oxide semiconductor preferably contains oxygen (O) and at least one element selected from the group consisting of indium (In), gallium (Ga), aluminum (Al), copper (Cu), zinc (Zn), magnesium (Mg), and cadmium (Cd), and more preferably contains indium (In), gallium (Ga), zinc (Zn), and oxygen (O). When an oxide semiconductor is used, the mobility of the TFTs 15 can be increased compared to the case of using amorphous silicon. Therefore, even when the definition is increased, that is, even when the ON time of the TFTs 15 per sub-pixel 2 is shortened, a sufficient voltage can be applied to the pixel electrodes 21. Also, when an oxide semiconductor is used, leakage current with TFTs 15 turned off (i.e. off-leakage current) can be reduced compared to the case of using amorphous silicon. Hence, regardless of whether the definition is high or not, drive modes such as low frequency driving and driving with stop periods can be employed, and thereby the power consumption can be reduced.

Specific examples of the oxide semiconductor include indium gallium zinc oxide (In—Ga—Zn—O, IGZO), $InGaO_3(ZnO)_5$, and $Mg_xZ_{1-x}O$, $Cd_xZn_{1-x}O$, and CdO. Also usable are amorphous, polycrystalline, or microcrystalline ZnO to which at least one element (impurity element) selected from the group consisting of group 1 elements, group 13 elements, group 14 elements, group 15 elements, and group 17 elements has been added, and amorphous, polycrystalline, or microcrystalline ZnO to which the above impurity elements have not been added.

The semiconductor layer 16 is covered with the gate insulating film 17, and the gate bus lines 13 and multiple gate electrodes 18 are formed on the gate insulating film 17. The gate electrodes 18 are integrally formed with the corresponding gate bus lines 13 and are thereby electrically connected to the gate bus lines 13. The gate bus lines 13 are connected to a gate driver (not illustrated) formed outside the display area.

In the display area, the gate bus lines 13 and the gate electrodes 18 are covered with the interlayer insulating film 22, and the source bus lines 14, multiple source electrodes 19, and multiple drain electrodes 20 are formed on the interlayer insulating film 22. In the gate insulating film 17 and the interlayer insulating film 22, multiple openings 34 and multiple openings 35 are formed, each of which functions as a contact hole. In each sub-pixel 2, the source electrode 19 and the drain electrode 20 are respectively arranged on one end portion and the other end portion of the semiconductor layer 16. The source electrode 19 is integrally formed with the corresponding source bus line 14 and is thereby electrically connected to the source bus line 14, while being in contact with one end (source region) of the semiconductor layer 16 through the opening 35. The drain electrode 20 is electrically connected to the pixel electrode 21, and is in contact with the other end (drain region) of the semiconductor layer 16 through the opening 34. Each TFT 15 includes the semiconductor layer 16, the gate insulating film 17, the gate electrode 18, the source electrode 19, and the drain electrode 20. The source bus lines 14 extend to intersect orthogonally with the gate bus lines 13, and are connected to a source driver (not illustrated) arranged outside the display area.

In the display area, the source bus lines 14, the source electrodes 19, and part of each of the drain electrodes 20 are covered with the interlayer insulating film 23. The interlayer insulating film 23 has a function as a flattening film as well as the function as an interlayer insulating film. Therefore, irregularities on the surface of the array substrate 10 can be reduced (flattened). The interlayer insulating film 23 includes multiple openings 36 each functioning as a contact hole. In the sub-pixels 2 in each row, the openings 36 are arranged in a line on a straight line (virtual straight line) 6 parallel to the column direction. The planar shape of each opening 36 is not particularly limited, but is usually a quadrilateral or a circle.

The surface of the interlayer insulating film 23 is substantially flat in the opening regions which transmit the light from the backlight. Meanwhile, in the light-shielding region, particularly between two adjacent openings 36, the surface of the interlayer insulating film 23 is rounded. More specifically, the interlayer insulating film 23 includes multiple curved portions 24 each arranged between two adjacent openings 36, and the openings 36 and the curved portions 24 are alternately arranged on the straight line 6. Also, each curved portion 24 has an upper surface (surface portion on the liquid crystal layer 3 side) which curves to draw an arc, and each curved portion 24 does not have a flat upper surface. In a cross section that is perpendicular to the array substrate 10 and passes the straight line 6 (hereinafter, such a cross section is also referred to as a perpendicular cross section), the height of each curved portion 24 monotonically increases and then monotonically decreases, from one end to the other end. Each curved portion 24 has one top portion in a perpendicular cross section, and the top portion is located at substantially the center of the curved portion 24, i.e., at substantially the center between two adjacent openings 36.

The height of each curved portion 24 or the interlayer insulating film 23 refers to a distance from the reference surface (e.g. main surface of the insulating substrate 11) to the surface of the curved portion 24 or the interlayer insulating film 23.

Also, a monotonic increase or decrease in the height of each curved portion 24 more specifically refers to the following state. First, an orthogonal coordinate system is introduced onto a perpendicular cross section. The x-axis is set in the direction parallel to the insulating substrate 11 with the right direction as the positive direction, and z-axis is set in the direction perpendicular to the x-axis with the upper direction (direction toward the liquid crystal layer 3) as the positive direction. Next, a given point on the outline of the curved portion 24 is represented as a coordinate (x, z). Here, a monotonic increase in the height of each curved portion 24 means that $z1 \leq z2$ if $x1 \leq x2$. A monotonic decrease in the height of each curved portion 24 means that $z1 \leq z2$ if $x1 \leq x2$.

The method for forming the interlayer insulating film 23 is not particularly limited. The interlayer insulating film 23 is preferably formed by the photolithography, preferably from a photosensitive resin film. In this case, the interlayer insulating film 23 contains a photosensitive resin. Examples of the material of the photosensitive resin film include photosensitive acrylate resins and photosensitive polyimides. The photosensitive resin film has a film thickness of 2 μm to 5 μm (preferably 3 μm to 3.6 μm). The interlayer insulating film 23 may further include an inorganic insulating film containing an inorganic insulating material such as silicon nitride (SiNx) and silicon oxide, or may contain a laminated film of an inorganic insulating film and a photosensitive resin film.

The pixel electrodes 21 are arranged on the interlayer insulating film 23, and in each sub-pixel 2, the pixel electrodes 21 are each in contact with the drain electrode 20 through the opening 36 to be electrically connected to the drain electrode 20. The pixel electrodes 21 are transparent, and are formed from a transparent conductive material such as indium-tin oxide (ITO) and indium-zinc oxide (IZO).

The gate driver sequentially supplies scanning signals to the multiple gate bus lines 13 based on the control by the controller (not illustrated) formed outside the display area. The source driver supplies image signals to the multiple source bus lines 14 based on the control by the controller, at the same time as the TFTs in each column are turned on by the scanning signals. Thereby, the pixel electrodes 21 in each column are set to be at electrical potentials corresponding to the image signals supplied via the corresponding TFTs 15. As a result, the electrons are stored as the storage capacitance (not illustrated) and as the liquid crystal capacitance formed by the pixel electrodes 21, the liquid crystal layer 3, and the later-described common electrode 44, whereby the multiple sub-pixels 2 are individually driven.

The counter substrate 40 includes an insulating substrate 41 having light transmittance, such as a glass plate and a quartz plate, and on the insulating substrate 41, a black matrix (BM) 42 functioning as a light shielding component, and color filters (not illustrated) in multiple colors are formed. The BM 42 is formed in the display area and the region surrounding the display area, and is formed to shield from light the surrounding region, the region facing the source bus lines 14 and the gate bus lines 13, and the regions facing the switching elements. Therefore, the openings 36 of the interlayer insulating film 23 are also covered with the BM 42. The BM 42 is formed from a light-shielding material, such a black colored resin.

The color filters of the respective colors are provided in the display area, and are formed to cover the regions defined by the BM 42, i.e., the openings of the BM 42. In this manner, the color filters in the respective colors are arranged in the corresponding sub-pixels 2, and the sub-pixels 2 are defined by the BM 42. The color filters are formed from colored resins that are colored in different colors from one another (e.g. red, blue, and green colored resins). The color filters may be arranged on the array substrate 10, not on the counter substrate 40.

The color filters and the BM 42 are covered with a transparent overcoat film 43. The overcoat film 43 is formed to reduce irregularities on the surface (flatten the surface) of the counter substrate 40. The overcoat film 43 is formed from a transparent insulating film containing an organic insulating material such as an acrylic resin and a polyimide.

On the overcoat film 43, the common electrode 44 is formed to cover the display area. To the common electrode 44, signals common to all the sub-pixels 2 (common signals) are supplied. The common electrode 44 is transparent, and is formed a transparent electrode material such as indium-tin oxide (ITO) and indium-zinc oxide (IZO).

On the common electrode 44, one or more spacers 45 are formed. The spacers 45 are components for maintaining a predetermined gap between the array substrate 10 and the counter substrate 40, and are arranged on the BM 42 at a predetermined pitch. The spacers 45 are longitudinal in a plan view, and the length (width) of each spacer 45 is greater in a first direction 7 than in a second direction 8, wherein the first direction 7 indicates the direction parallel to the straight line 6, and the second direction 8 indicates the direction orthogonal to the first direction 7. The method for forming the spacers 45 is not particularly limited. The spacers 45 are preferably formed by the photolithography, preferably from a photosensitive resin film. In this case, the spacers 45 may be photospacers. Examples of the material of the photosensitive resin film include photosensitive acrylate resins, and photosensitive polyimides. When the array substrate 10 and the counter substrate 40 are in contact with each other in the portions where the spacers 45 are formed, a substantially uniform thickness (cell gas) of the liquid crystal layer 3 is maintained. The number of the spacers 45 is not particularly limited, but is usually set to a smaller number than the number of the sub-pixels 2.

Figure 4:
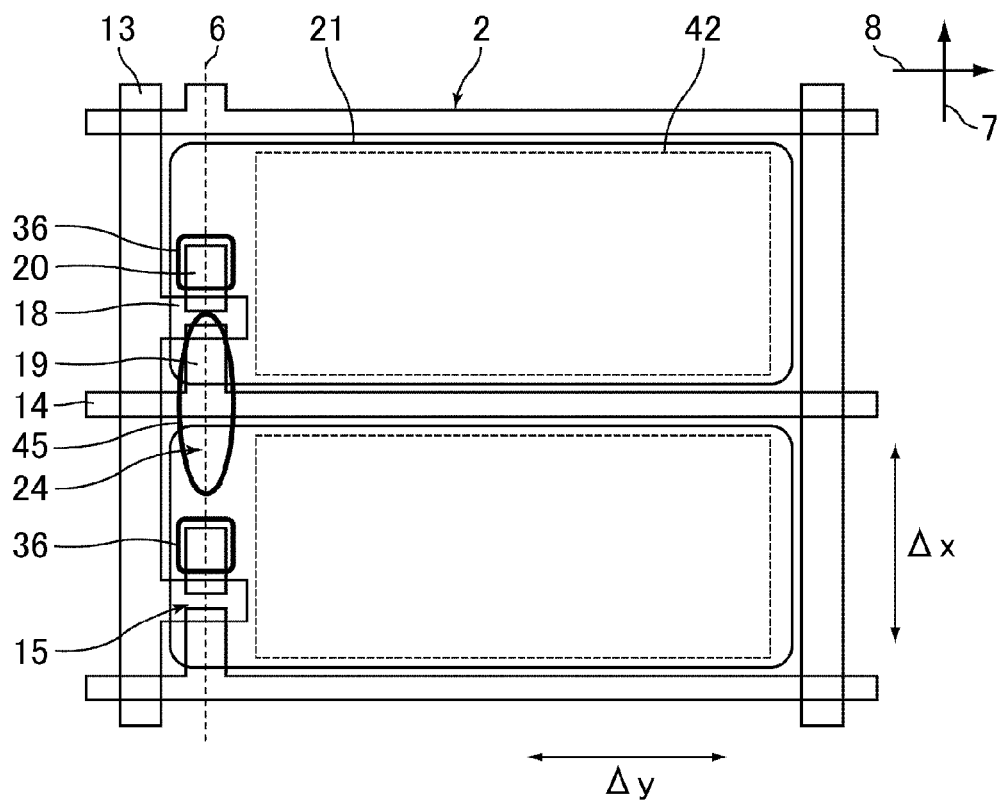
FIG. 4 is a schematic plan view illustrating another structure of the liquid crystal display of Embodiment 1.
Figure 5:
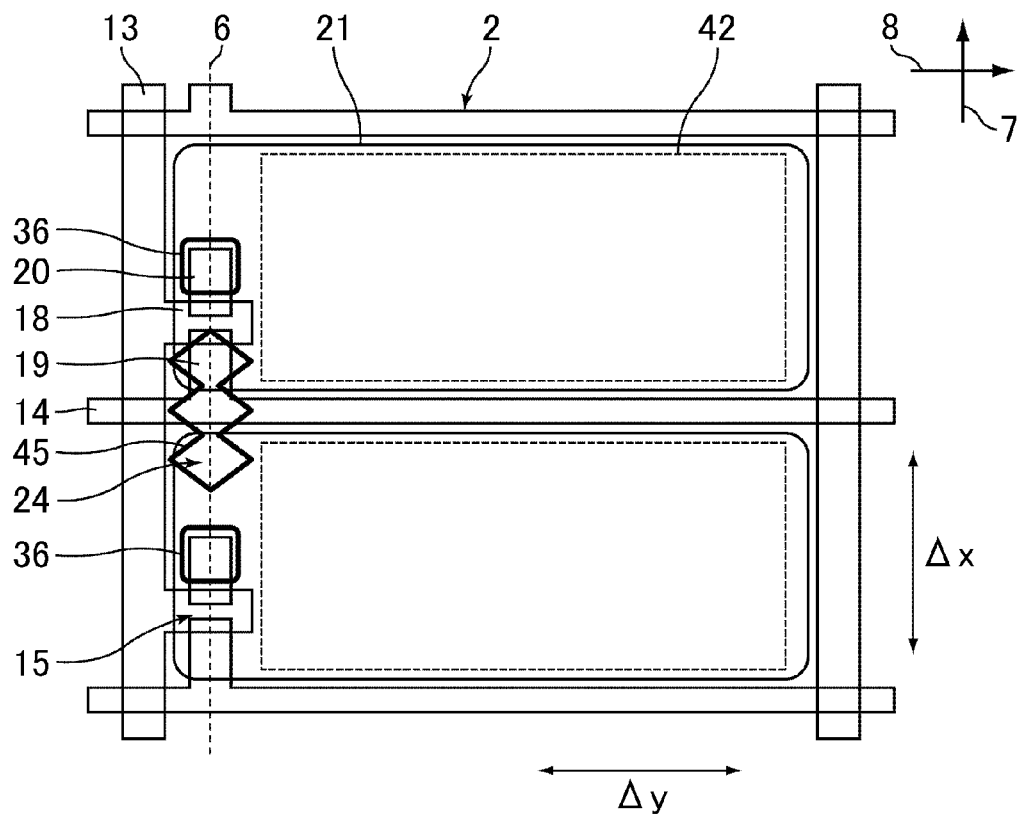
FIG. 5 is a schematic plan view illustrating yet another structure of the liquid crystal display of Embodiment 1.
Figure 6:
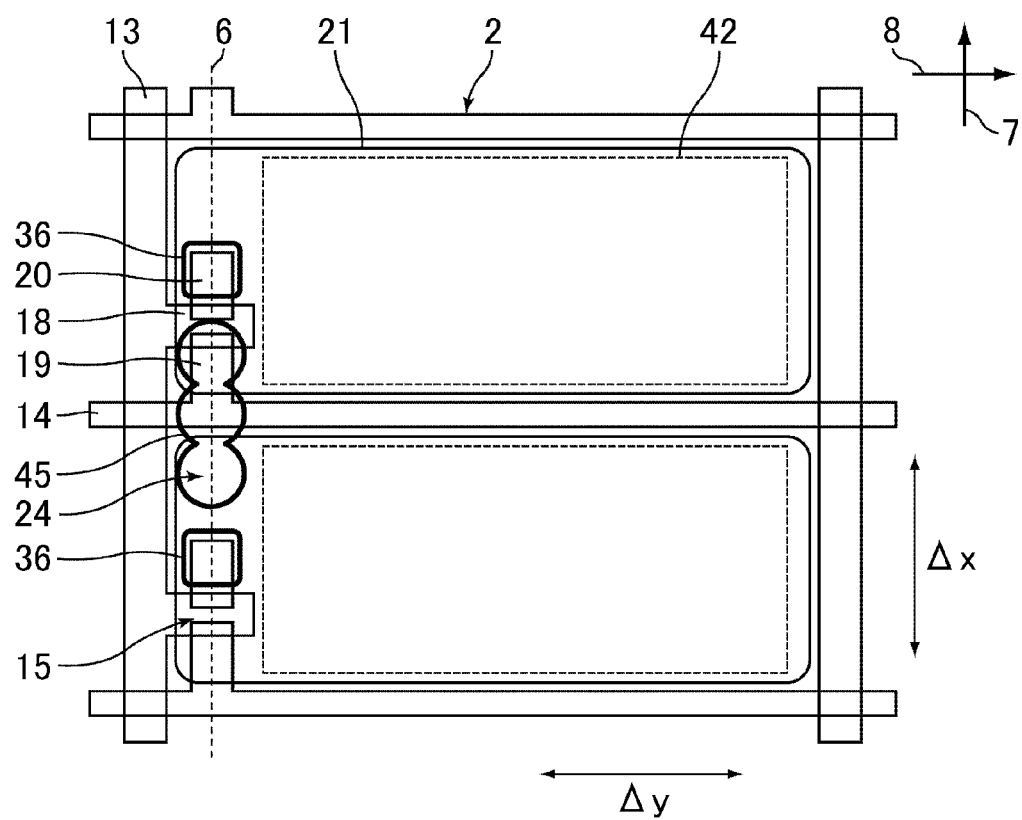
FIG. 6 is a schematic plan view illustrating yet another structure of the liquid crystal display of Embodiment 1.

The specific planar shape of each spacer 45 is not particularly limited, but each spacer 45 may have an n-sided polygonal shape (wherein n is an integer of 3 or greater) in a plan view. Specific examples of the n-sided polygonal shape include quadrilaterals, pentagons, and hexagons, and in particular, quadrilaterals are suitable. The suitable quadrilaterals are parallelograms (cf. FIG. 1), rectangles, and trapezoids. Each spacer 45 may be formed into an oval shape in a plan view, as illustrated in FIG. 4. In this case, the spacers 45 can be more easily formed by the photolithography. Each spacer 45 may be formed into a shape that is a combination of multiple shapes in a plan view. Although the specific kinds of the multiple shapes are not particularly limited, geometric shapes are preferred. In particular, rectangles, trapezoids, parallelograms, rhombuses, circles, and ovals are suitable. For example, each spacer 45 may be formed into a shape obtained by combining multiple rhombi as illustrated in FIG. 5, or may be a shape obtained by combining multiple circles as illustrated in FIG. 6. In this manner, each spacer 45 may be formed into a shape in which multiple shapes partially overlap each other in a plan view, or may be an integrated structure. Each spacer 45 may also be formed into a shape that is a combination of multiple shapes being apart from each other in a plan view, or may be a structure including multiple portions being apart from each other. The multiple shapes may include only one kind or two or more kinds. Furthermore, the planar shape of each spacer 45 may include a shape obtained by partially cutting any of the above shapes, and may include irregular shapes. However, in the present embodiment, each shape constituting the planar shape of each of the spacers 45 has a center and/or a center of gravity on the straight line 6 in a plan view.

An alignment film (not illustrated) is formed on the liquid crystal layer 3 side surfaces of the respective array substrate 10 and counter substrate 40. To the alignment films, an alignment treatment such as a rubbing treatment and a photoalignment treatment may be performed, or an alignment treatment may not be performed as in the case of a vertical alignment film. The alignment films can be formed from, for example, a resin material such as a polyimide.

When the array substrate 10 and the counter substrate 40 are attached to each other such that the respective alignment films face each other, a gap with a predetermined thickness is formed by the spacers 45. The liquid crystal layer 3 is formed by enclosing a liquid crystal composition containing nematic liquid crystal in this gap. The liquid crystal layer 3 is enclosed between the substrates 10 and 40 by a sealing material. The sealing material is provided to surround the display area, and attaches the substrates 10 and 40 to each other.

To the respective main surfaces of the array substrate 10 and the counter substrate 40 opposite to the liquid crystal layer 3 sides, optical elements 4 and 5 are attached. The optical elements 4 and 5 each include a polarizing plate, and the polarizing plates are usually arranged at crossed Nicols.

In the present embodiments, in the sub-pixels 2 in each column, the openings 36 of the interlayer insulating film 23 are arranged on the straight line 6, and each spacer 45 faces the curved portion(s) 24 of the interlayer insulating film 23. Therefore, the openings 36 and the spacers 45 which can cause light leakage can be arranged on the straight line 6. Also, the length (width) of each spacer 45 in the first direction 7 is longer (wider) than the length (width) of the spacer 45 in the second direction 8. That is, the spacers 45 are shorter in the direction orthogonal to the arrangement direction of the openings 36 compared to the arrangement direction of the openings 36. Therefore, the region for shielding the openings 36 and the spacers 45 can be reduced, and thereby the aperture ratio can be increased.

Here, arrangement of the openings 36 on the straight line 6 means that at least part of each opening 36 is arranged on the straight line 6 in a plan view, and from the viewpoint of the aperture ratio, the openings 36 in a planar shape each preferably have a center and/or a center of gravity on the straight line 6 in a plan view.

Also in the present embodiment, each shape constituting the planar shape of each of the spacers 45 has a center and/or a center of gravity on the straight line 6 in a plan view. Therefore, the region for shielding the openings 36 and the spacers 45 from light can be further reduced and the aperture ratio can be increased, compared to the later-described Embodiment 2.

Since the upper surface portions of the curved portions 24 are curved, even when the distance between two adjacent openings 36 is shortened, the side surface portions (portions adjacent to the openings 36) of the interlayer insulating film 23 can be easily formed into a forward tapered shape with a gentle slope. That is, from the viewpoints of an increase in the definition and prevention of unevenness in the film thickness of the alignment film, the interlayer insulating film 23 has a preferred shape. However, the interlayer insulating film 23 can be considered to have a disadvantageous shape from the viewpoint of preventing generation of defects when attachment misalignment is generated between the substrates 10 and 40.

Figure 7:
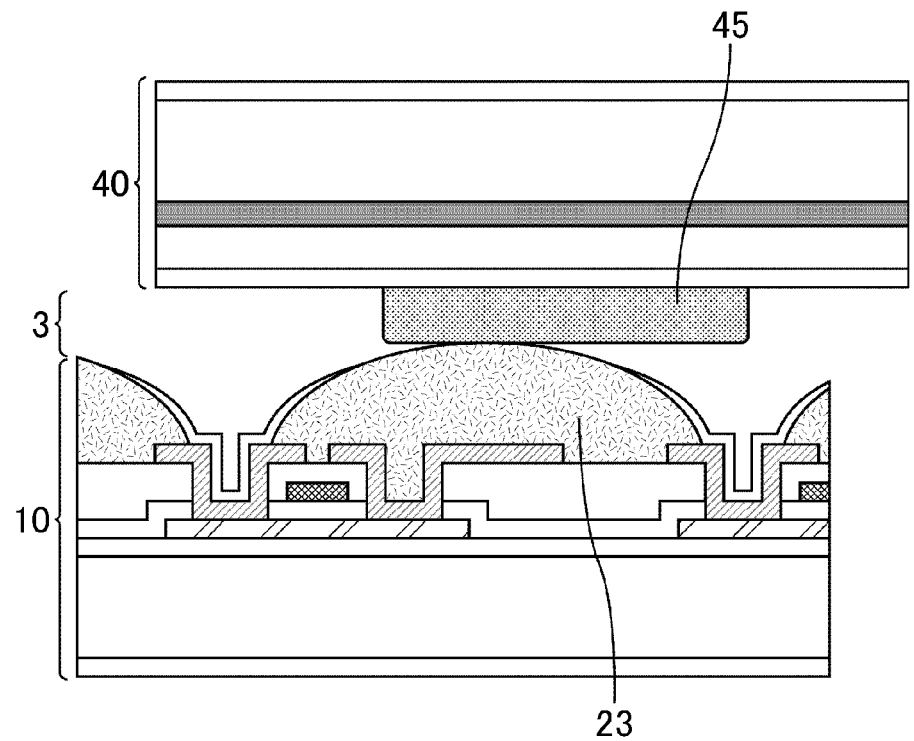
FIG. 7 is a schematic view illustrating a cross-sectional structure of the liquid crystal display of Embodiment 1, showing the state where attachment misalignment of an array substrate and a counter substrate is generated.

Accordingly, in the present embodiment, the spacers 45 are longer in the first direction 7 than in the second direction 8. Each spacer 45 can therefore be prevented from having only one top point such as those of the spacers 145 in Comparative Embodiment 1. Also, there can be multiple portions where the heights of each spacer 45 are substantially the same in the first direction 7. Although it depends on the size and shape of each spacer, the top portion of the spacer 45 may be formed into a linear or planar shape substantially parallel to the insulating substrate 41, the spacer 45 may have two or more of such linear or planar portions, or the spacer 45 may have multiple top points having substantially the same height. It is therefore possible to suppress generation of defects even when the substrates 10 and 40 attached to each other are off from the predetermined positions. More specifically, when attachment misalignment of the substrates 10 and 40 in the first direction 7 is generated as illustrated in FIG. 7, the array substrate 10 and the counter substrate 40 are in contact with each other at points in the portions where the spacers 45 are formed as in Comparative Embodiment 1. Here, differently from Comparative Embodiment 1, the present embodiment can prevent the gap between the substrate 10 and the substrate 40 from being greatly changed. Generation of unevenness in the thickness of the liquid crystal layer 3 can therefore be suppressed even when a predetermined amount of a liquid crystal material is supplied to the gap between the substrates 10 and 40, and thus generation of display unevenness can be suppressed. Also, since reduction in the elastic force (restorability) of the spacers 45 can be suppressed, the liquid crystal panel 1 of the present embodiment is suitable for a panel provided with a touch panel system.

The height of each spacer 45 means the distance from the insulating substrate 41, and the top portion of each spacer 45 means the farthest portion from the insulating substrate 41.

Also, in a cross section parallel to the second direction 8, particularly in a cross section that is parallel to the second direction 8 and passes through substantially the center of the space between two adjacent openings 36, the curved portions 24 of the interlayer insulating film 23 are flat, and the surfaces thereof are substantially parallel to the insulating substrate 41 as illustrated in FIG. 3. Although it depends on the size and shape of each spacer, there can be multiple portions where the heights of the spacer 45 are substantially the same in the second direction 8. Here, the present embodiment can prevent the gap between the substrate 10 and the substrate 40 from being greatly changed even if attachment misalignment is generated between the substrates 10 and 40 in the second direction 8.

Figure 8:
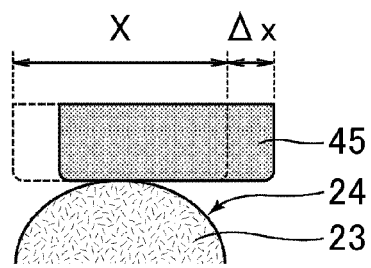
FIG. 8 is a schematic cross-sectional view illustrating a spacer, and a curved portion of an interlayer insulating film in Embodiment 1.
Figure 9:
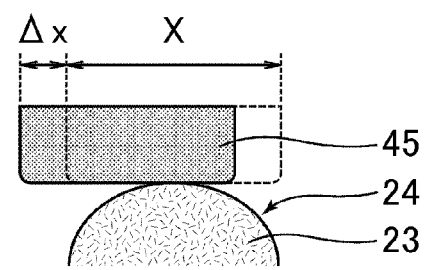
FIG. 9 is another schematic cross-sectional view illustrating a spacer, and a curved portion of an interlayer insulating film in Embodiment 1.
Figure 10:
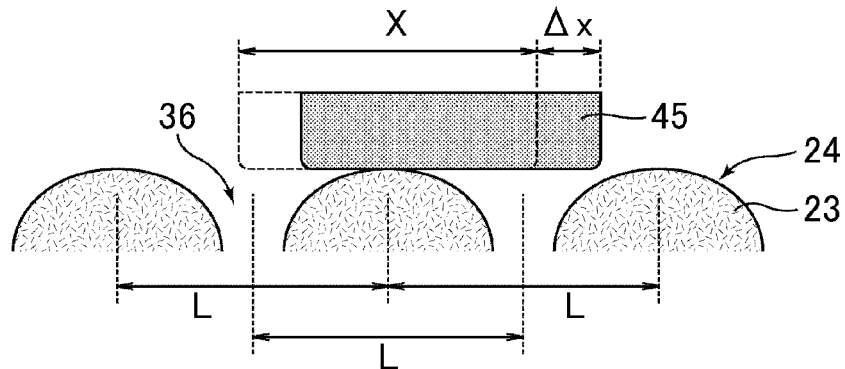
FIG. 10 is yet another schematic cross-sectional view illustrating a spacer, and curved portions of an interlayer insulating film in Embodiment 1.

Each spacer 45 may be pushed against at least one curved portion 24, or may be pushed against only one curved portion 24 as illustrated in, for example, FIG. 2. In this case, as illustrated in FIG. 8 and FIG. 9, the length (width) X of each spacer 45 in the first direction 7 and the precision $\Delta x$ of the attachment of the substrates 10 and 40 in the first direction 7 preferably satisfy the relation $2 \times \Delta x \leq X$. If X is less than $2 \times \Delta x$, the spacers 45 may not be arranged on the desired positions (usually, the top portions) of the curved portions 24 when attachment misalignment of the substrates 10 and 40 is generated, and thus the gap between the substrate 10 and the substrate 40 may be changed. As illustrated in FIG. 10, X, $\Delta x$, and the pitch L of the opening 36 (for example, the distance between the centers or centers of gravity of the planar shapes of the openings 36) in the first direction 7 preferably satisfy the relation $X \leq 2 \times L - 2 \times \Delta x$. If X is larger than $2 \times L - 2 \times \Delta x$, each spacer 45 may possibly be pushed against two or more of the curved portions 24 when attachment misalignment is generated between the substrates 10 and 40.

Here, the precision of attachment of the substrates 10 and 40 means the size (distance) of maximum misalignment that can be generated when the substrate 10 and the substrate 40 are attached to each other. The pitch L of the openings 36 is substantially the same as the pitch of the curved portions 24 in the first direction 7 (for example, the distance between the top portions of the curved portions 24), and is also substantially the same as the pitch of the sub-pixels 2 in the first direction 7.

Figure 11:
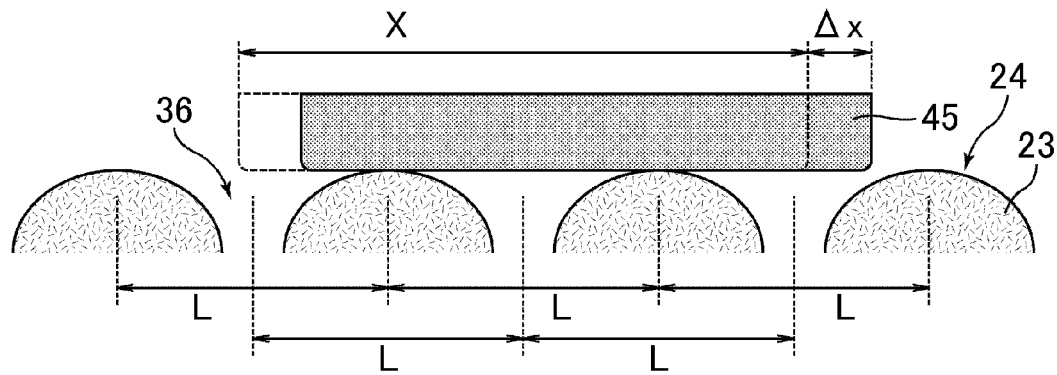
FIG. 11 is yet another schematic cross-sectional view illustrating a spacer, and curved portions of an interlayer insulating film in Embodiment 1.

Each spacer 45 may be pushed against N curved portions 24, wherein N is an integer of 2 or greater, as illustrated in FIG. 11. Thereby, the influence on the qualities can be reduced even if the spacers 45 are locally damaged. In this case, X and $\Delta x$ preferably satisfy the relation $(N-1) \times L + 2 \times \Delta x \leq X$. When X is less than $(N-1) \times L + 2 \times \Delta x$, each spacer 45 may not be arranged at the desired position (usually, the top portion) of the N curved portions 24 when attachment misalignment of the substrates 10 and 40 is generated. Also, X, $\Delta x$, and L preferably satisfy the relation $X \leq (N+1) \times L - 2 \times \Delta x$. If X is larger than $(N+1) \times L - 2 \times \Delta x$, each spacer 45 may possibly be pushed against N+1 curved portions 24 when attachment misalignment is generated between the substrates 10 and 40.

As illustrated in FIG. 12, the length (width) Y of each spacer 45 in the second direction 8 and the attachment precision $\Delta y$ of the substrates 10 and 40 in the second direction 8 preferably satisfy the relation $2 \times \Delta y \leq Y$. If Y is less than $2 \times \Delta y$, the spacers 45 may not be arranged at the desired positions of the curved portions 24 when attachment misalignment of the substrates 10 and 40 is generated.

Also, as illustrated in FIG. 12, Y and the width B of the BM 42 in the second direction 8 preferably satisfy the relation $Y \leq B$. If Y is larger than B, the spacers 45 may be protruded out from the spacers 45, and thereby light leakage may occur.

As illustrated in FIG. 12, the interlayer insulating film 23 may include multiple projection portions 25 arranged with the spacer 45 in between in the second direction 8. In this case, Y, $\Delta y$, and the distance M between two end portions of the projection portions 25 facing each other in the second direction 8 preferably satisfy the relation $Y \leq M - 2 \times \Delta y$. If Y is greater than $M - 2 \times \Delta y$, the spacers 45 may be arranged on the projection portions 25 when attachment misalignment is generated between the substrates 10 and 40, and the gap between the substrate 10 and the substrate 40 may change.

The projection portions 25 are formed due to the components arranged between the interlayer insulating film 23 and the insulating substrate 11, e.g., components such as the gate bus lines 13, the source bus lines 14, the semiconductor layers 16, and the interlayer insulating films 23. Under the projection portions 25, a light-shielding film may be formed.

In the case that each spacer 45 has a shape that is a combination of multiple shapes being apart from each other, X and Y are defined as the respective lengths (widths) in the first direction 7 and the second direction 8 of an integrated structure that includes all the shapes included in the spacer 45.

The spacers 45 each preferably have a flat upper surface (surface portion on the liquid crystal layer 3 side), and the upper surfaces exhibit a height deviation of 0.05 μm or less, more preferably 0.03 μm or less. This is because if the thickness of the liquid crystal layer 3 changes by more than 0.05 μm, the change may be perceived as display unevenness. From the same viewpoint, as illustrated in FIG. 13, the difference $\Delta Z$ between the height of the spacer 45 at the center or the center of gravity of the planar shape of the spacer 45 and the height of the spacer 45 at a position that is away from the center or the center of gravity by $\Delta x$ in the first direction 7 is preferably 0.05 μm or less, and more preferably 0.03 μm or less. The $\Delta Z$ may be a difference between the height of the spacer 45 at the center or the center of gravity of the planar shape of the spacer 45 and the height of the spacer 45 at a position that is away from the center or the center of gravity by $\Delta x$ in the second direction 8. Also in this case, $\Delta Z$ is preferably 0.05 μm or less, and more preferably 0.03 μm or less.

Embodiment 2

The present embodiment is substantially the same as Embodiment 1 except that the shapes of the spacers are different. Accordingly, in the present embodiment, the features of the present embodiment are mainly described, and the same features as in Embodiment 1 are not described. Also, components in the present embodiment having functions which are the same as or similar to those in Embodiment 1 are provided with the same reference signs, and these components are not described in the present embodiment.

Figure 14:
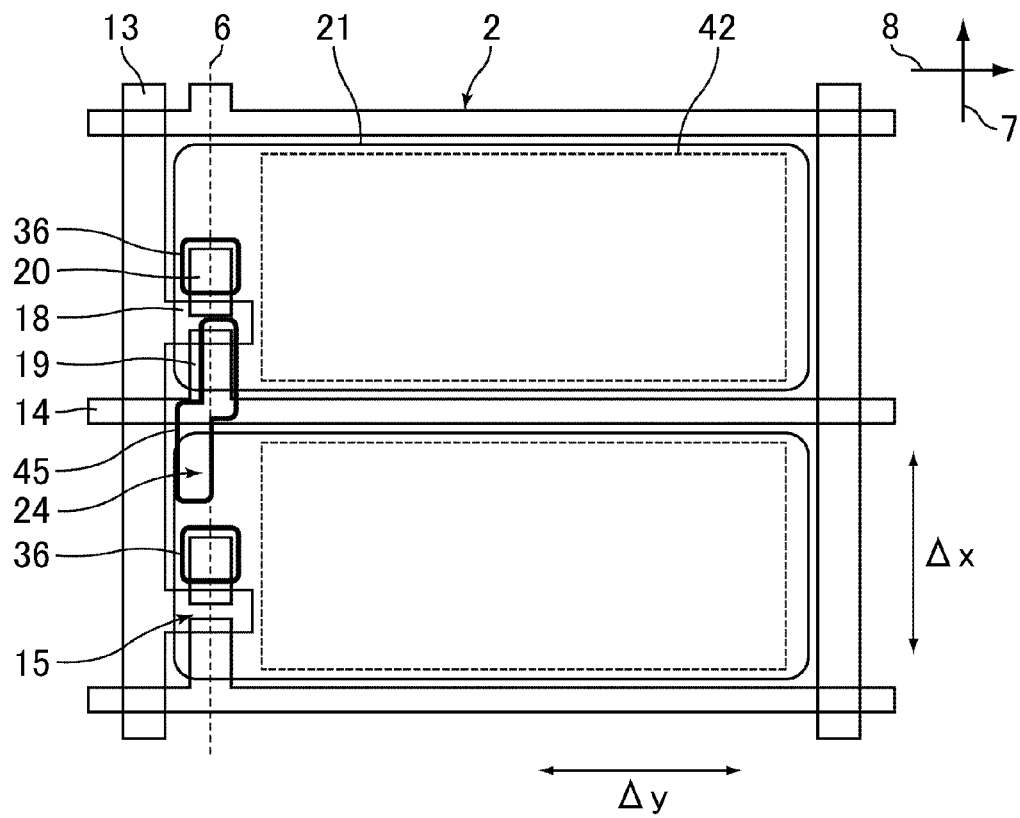
FIG. 14 is a schematic plan view illustrating a structure of a liquid crystal display of Embodiment 2.
Figure 15:
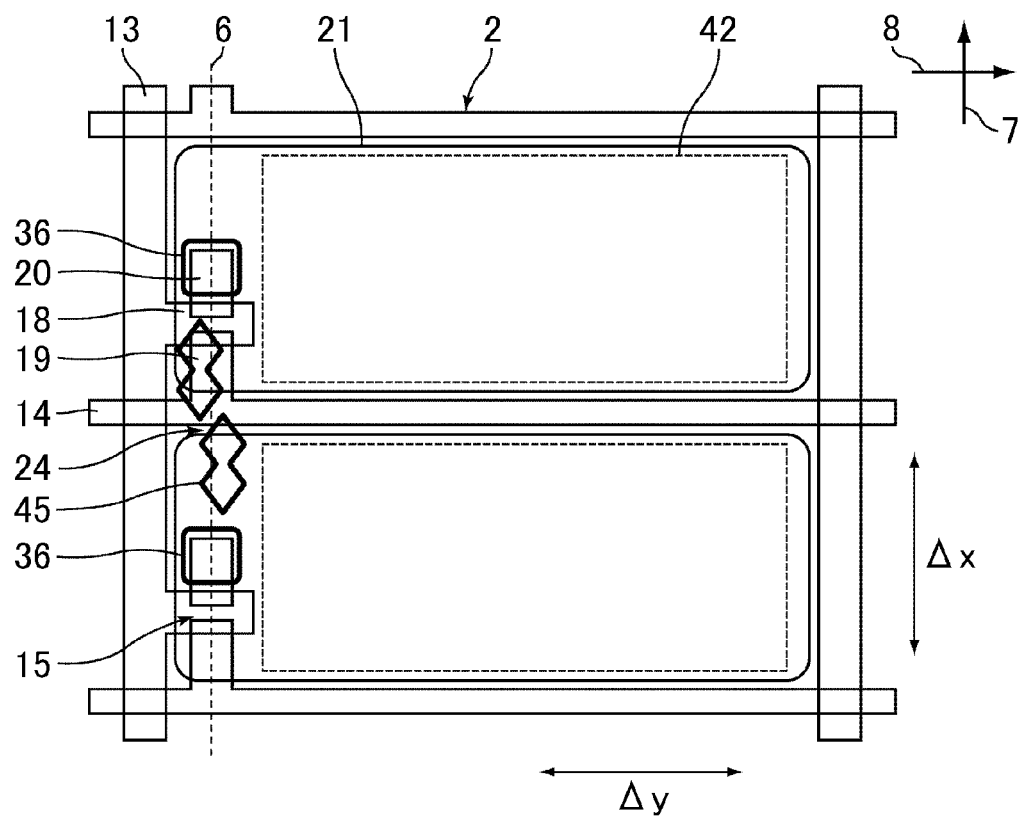
FIG. 15 is a schematic plan view illustrating another structure of the liquid crystal display of Embodiment 2.
Figure 16:
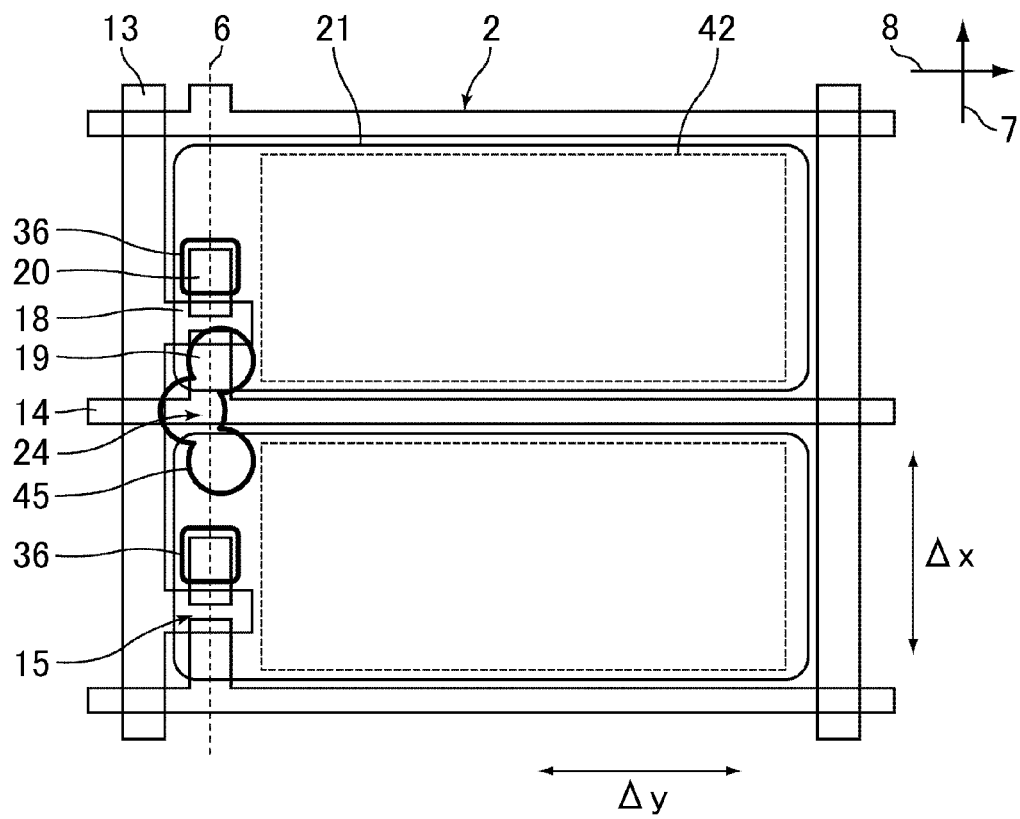
FIG. 16 is a schematic plan view illustrating yet another structure of the liquid crystal display of Embodiment 2.
Figure 17:
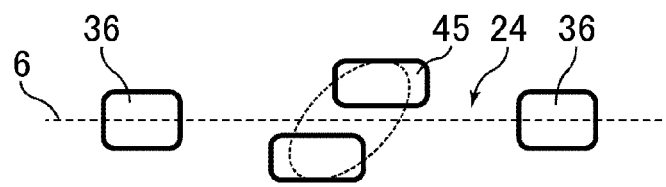
FIG. 17 is a schematic cross-sectional view illustrating spacers, and openings of an interlayer insulating film in Embodiment 2.
Figure 18:
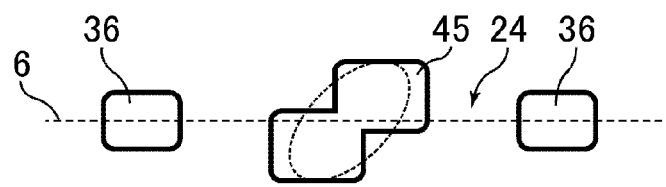
FIG. 18 is another schematic cross-sectional view illustrating a spacer, and openings of an interlayer insulating film in Embodiment 2.
Figure 19:
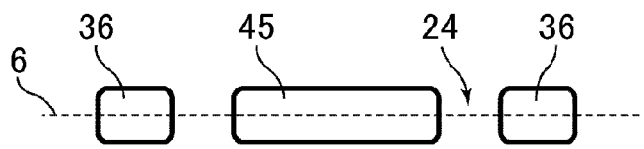
FIG. 19 is a schematic cross-sectional view illustrating a spacer, and openings of an interlayer insulating film in Embodiment 1.

FIGS. 14 to 16 are schematic plan views each illustrating a structure of the liquid crystal display of Embodiment 2. FIGS. 17 and 18 are schematic cross-sectional views each illustrating spacer(s) and the openings of an interlayer insulating film in Embodiment 2. FIG. 19 is a schematic cross-sectional view illustrating a spacer and openings of an interlayer insulating film in Embodiment 1.

As illustrated in FIGS. 14 to 18, each spacer 45 is formed to have a shape that is a combination of multiple shapes in a plan view in the present embodiment. For example, as illustrated in FIGS. 14 and 18, the spacer 45 may be formed into a shape in which two rectangles partially overlap each other in a plan view. As illustrated in FIG. 15, the spacer 45 may include upper and lower portions being apart from each other in a plan view, and each portion may have a shape in which two rhombi partially overlap each other. As illustrated in FIG. 16, the spacer 45 may be formed into a shape in which three circles partially overlap each other in a plan view. As illustrated in FIG. 17, the spacer 45 may be formed into a shape in which two rectangles are apart from each other in a plan view. As described above, the spacer 45 may be formed into a shape that is a combination of multiple shapes partially overlapping each other in a plan view, or may be an integrated structure. Meanwhile, the spacer 45 may be formed into a shape that is a combination of multiple shapes being apart from each other in a plan view, or may be a structure including multiple portions being apart from each other. The spacers 45 illustrated in FIGS. 17 and 18 can exhibit the same function as oval spacers indicated by a dashed line.

When each spacer 45 includes multiple shapes (portions) apart from each other, the width of each space between adjacent shapes (portions) is not particularly limited, but is usually set to a width less than the pitch of the openings 36. The width of each space is preferably from 2 µm inclusive to 4 µm inclusive.

However, in the present embodiment, the shapes constituting the planar shape of each spacer 45 have the centers and/or the centers of gravity which are not on the straight line 6. In the cases illustrated in FIGS. 14, 17, and 18, the center and the center of gravity of the upper rectangle portion are arranged at the right side of the straight line 6, and the center and the center of gravity of the lower rectangle portion are arranged at the left side of the straight line 6. In the case illustrated in FIG. 15, the center and the center of gravity of the upper portion are arranged at the left side of the straight line 6, and the center and the center of gravity of the lower portion are arranged at the right side of the straight line 6. In the case illustrated in FIG. 16, the centers and the centers of gravity of the circle portions at both ends are arranged at the right side of the straight line 6, and the center and the center of gravity of the circle portion at the center are arranged at the left side of the straight line 6.

Also in the present embodiment, the openings 36 are arranged on the same straight line 6 parallel to the row direction, and each spacer 45 faces the curved portion(s) 24 of the interlayer insulating film. The length (width) of each spacer 45 in the first direction 7 is longer (wider) than the length (width) of the spacer 45 in the second direction 8. The aperture ratio can therefore be increased. However, in the present embodiment, the centers and/or the centers of gravity of the shapes constituting the planar shape of the spacer 45 are not arranged on the straight line 6 in a plan view. From the viewpoint of an increase in the aperture ratio, Embodiment 1 is preferable to the present embodiment.

The spacers 45 are longer in the first direction 7 than in the second direction 8. Hence, as in the case of Embodiment 1, even when attachment misalignment is generated between the substrates 10 and 40 in the first direction 7, defects such as display unevenness can be more effectively suppressed.

Furthermore, in the present embodiment, the centers and/or the centers of gravity of the shapes constituting the planar shape of the spacer 45 are not arranged on the straight line 6 in a plan view. Accordingly, multiple points at which the heights of the spacer 45 are substantially the same can be more reliably formed not only in the first direction 7 but also in the second direction 8. Generation of defects such as display unevenness can therefore be more effectively suppressed in the case that attachment misalignment of the substrates 10 and 40 is generated in the second direction 8.

From the same viewpoint as in Embodiment 1, the length X of each spacer 45 in the first direction 7 and the length Y of the spacer 45 in the second direction 8 preferably satisfy the inequalities described in Embodiment 1.

Embodiment 3

The present embodiment is substantially the same as Embodiment 1 except that the shapes of the spacers are different. Accordingly, in the present embodiment, the features of the present embodiment are mainly described, and the same features as in Embodiment 1 are not described. Also, components in the present embodiment having functions which are the same as or similar to those in Embodiment 1 are provided with the same reference signs, and these components are not described in the present embodiment.

Figure 20:
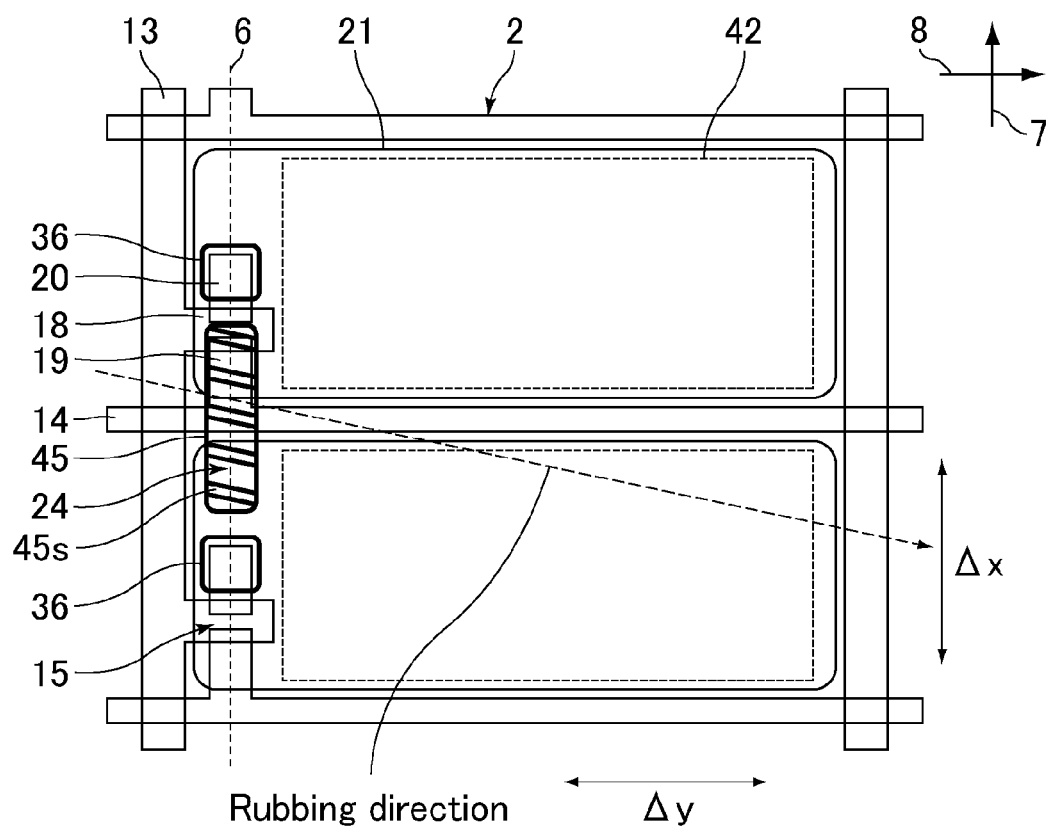
FIG. 20 is a schematic plan view illustrating a structure of a liquid crystal display of Embodiment 3.
Figure 21:
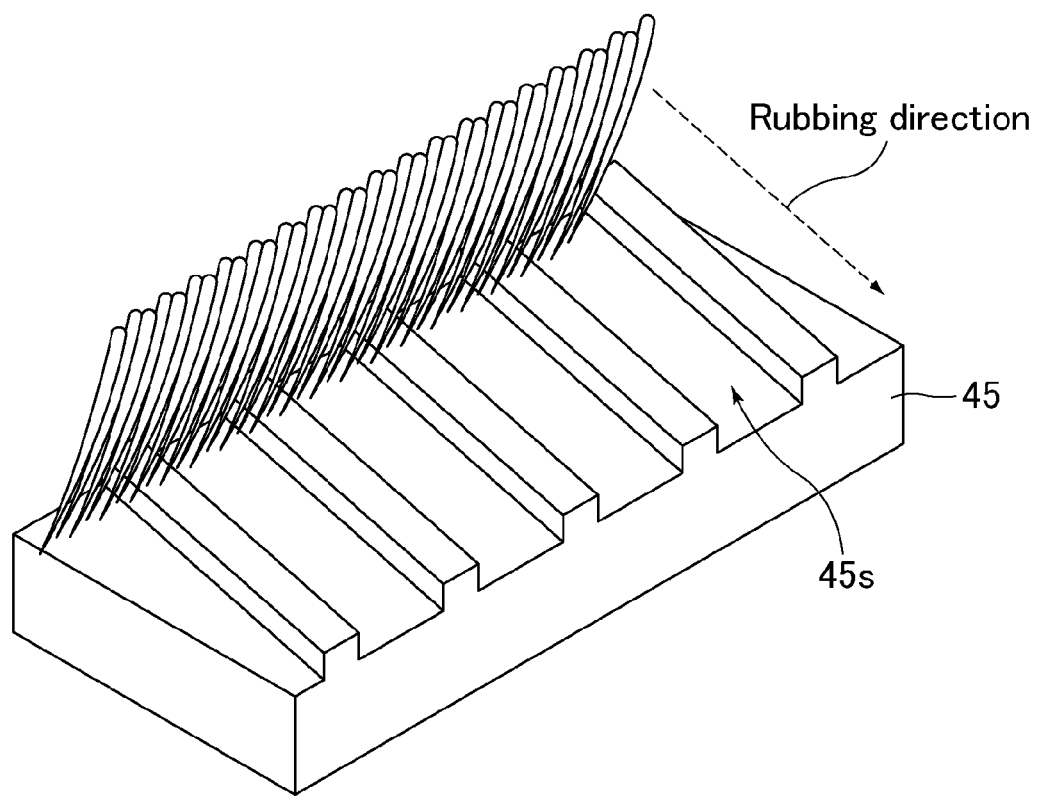
FIG. 21 is a schematic perspective view illustrating a spacer in Embodiment 3.
Figure 22:
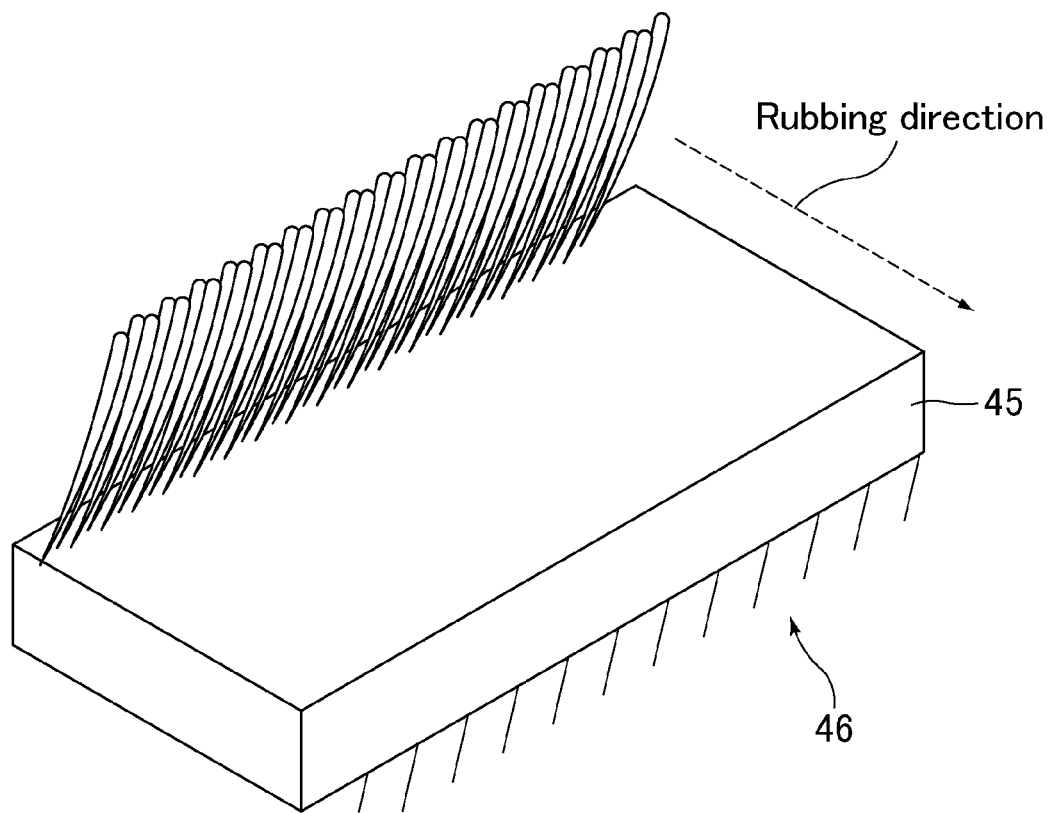
FIG. 22 is a schematic perspective view illustrating a spacer in Embodiment 1.
Figure 23:
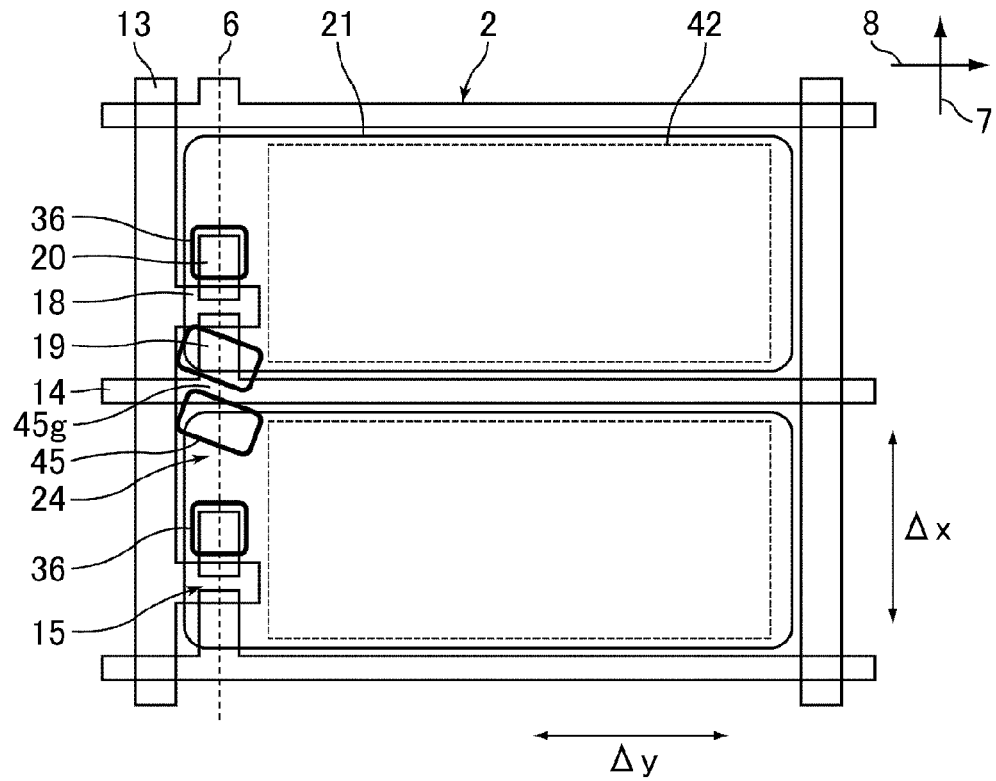
FIG. 23 is a schematic plan view illustrating another structure of the liquid crystal display of Embodiment 3.
Figure 24:
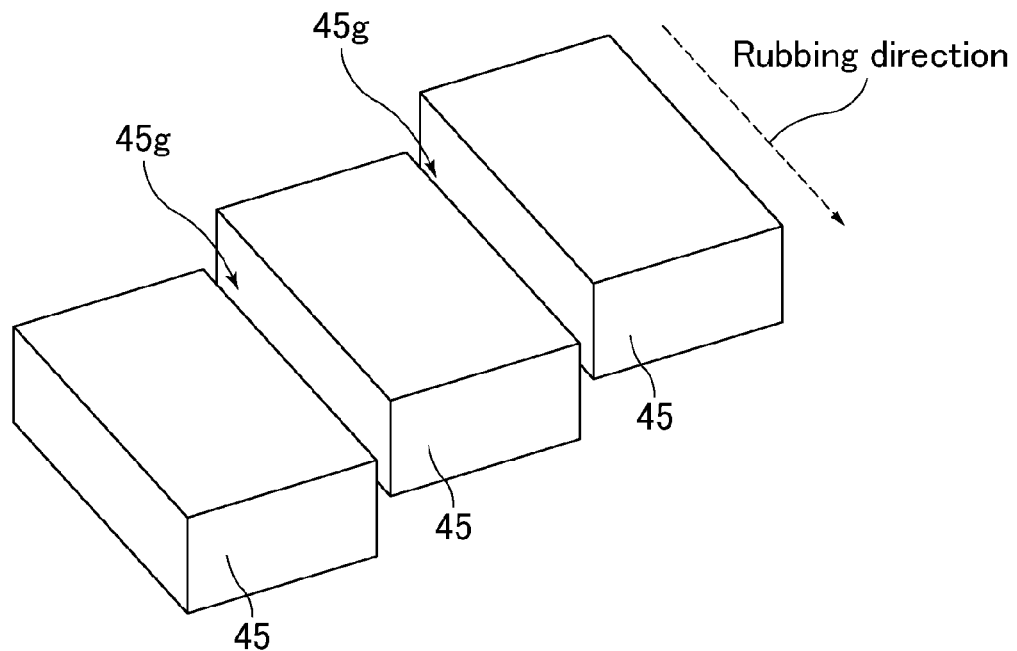
FIG. 24 is a schematic perspective view illustrating spacers in Embodiment 3.
Figure 25:
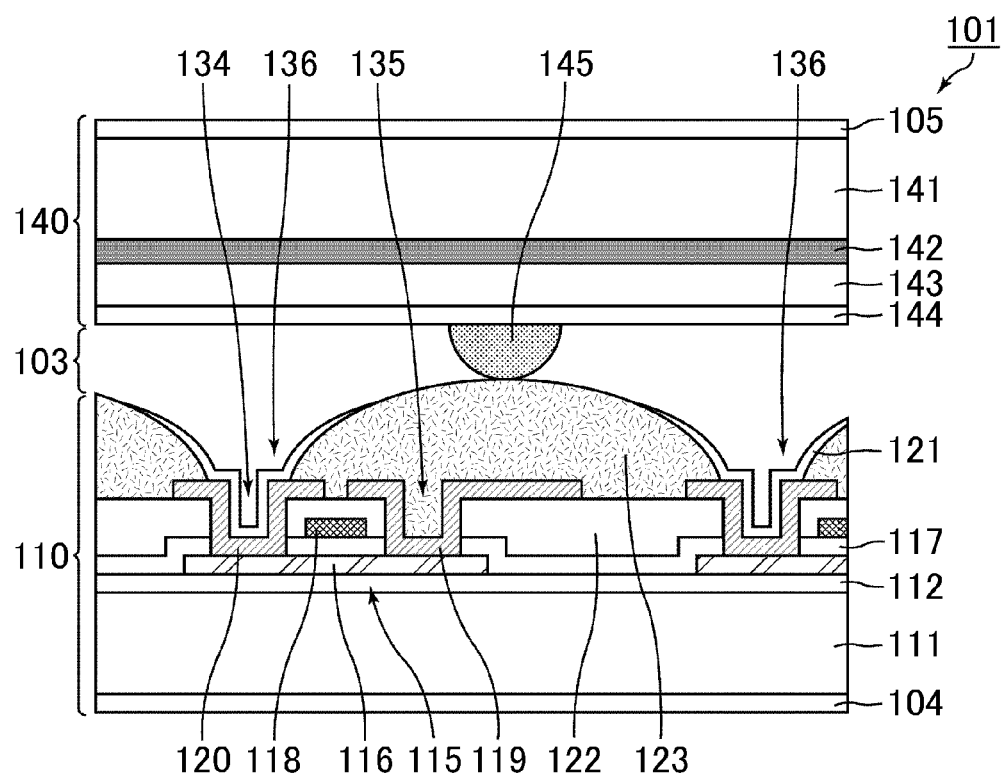
FIG. 25 is a schematic view illustrating a cross-sectional structure of a liquid crystal display of Comparative Embodiment 1.
Figure 26:
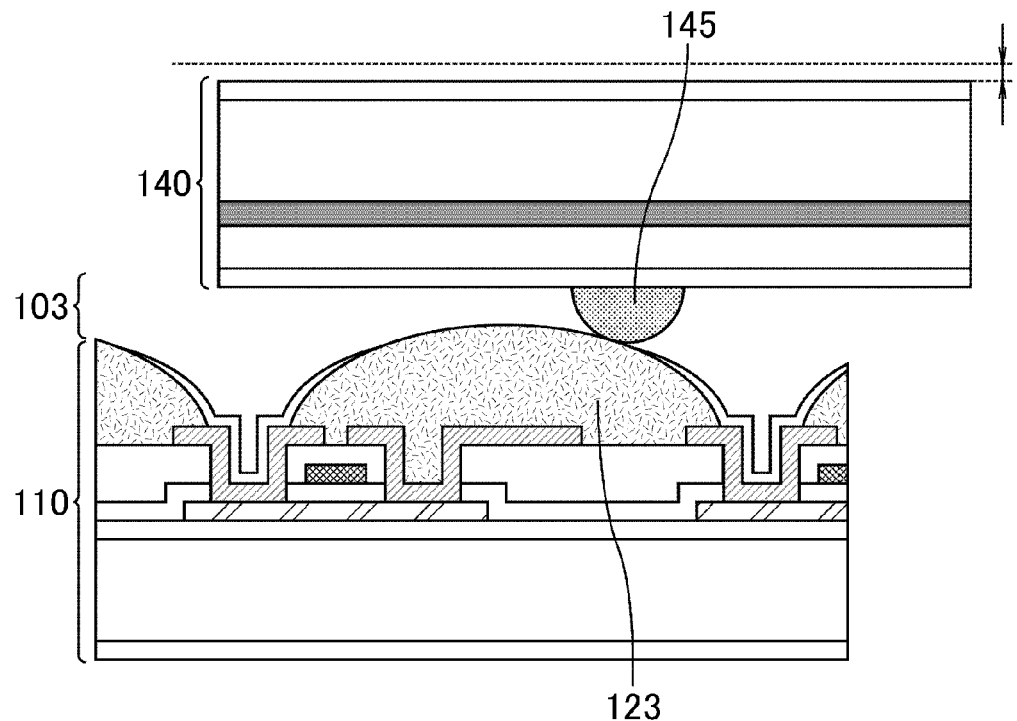
FIG. 26 is a schematic view illustrating a cross-sectional structure of the liquid crystal display of Comparative Embodiment 1, showing the state where attachment misalignment of an array substrate and a counter substrate is generated.
Figure 27:
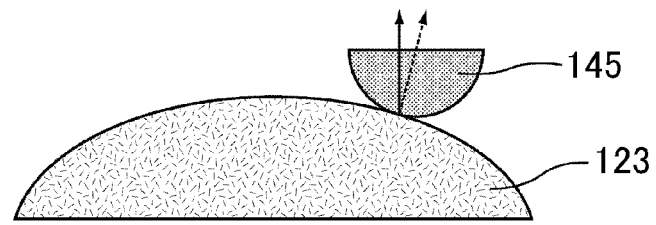
FIG. 27 is a schematic cross-sectional view illustrating a spacer and an interlayer insulating film in Comparative Embodiment 1.
Figure 28:
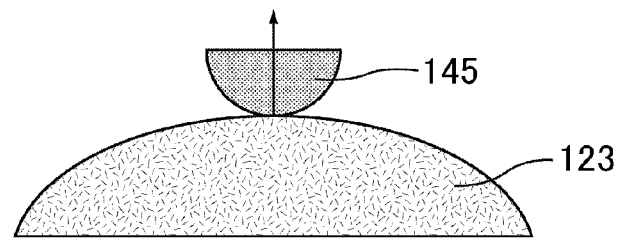
FIG. 28 is another schematic cross-sectional view illustrating a spacer and an interlayer insulating film in Comparative Embodiment 1.

FIGS. 20 and 23 are schematic plan views each illustrating a structure of the liquid crystal display of Embodiment 3. FIGS. 21 and 24 are perspective schematic views each illustrating spacer(s) in Embodiment 3. FIG. 22 is a perspective schematic plan view illustrating a spacer in Embodiment 1.

The area of the spacers 45 described in Embodiments 1 and 2 is likely to be larger than the area of spacers having a common shape (e.g. cylindrical spacers) in a plan view. Hence, in the case of using alignment films requiring an alignment treatment by rubbing, a region 46 for which the alignment treatment by rubbing has not been sufficiently performed is generated as illustrated in FIG. 22, which may weaken the alignment force. Particularly when the rubbing direction is the second direction 8, the tips of the hair of the rubbing cloth are likely to be disordered by the spacers 45, and the alignment force of the alignment film is likely to be weakened.

Hence, in the present embodiment, fine slits 45s are formed on the surface of each spacer 45 along the rubbing direction as illustrated in FIG. 20 and FIG. 21. For this reason, the tips of the hair of the rubbing cloth are not likely to be disordered by the spacers 45, and a decrease in the alignment force of the alignment film can be suppressed.

The width and depth of the slits 45s are not particularly limited. The width may be, for example, 2 µm or less. Also, the method for forming the slits 45s is not particularly limited, and the slits 45s can be formed by the photolithography using a half-tone phase shift mask.

As illustrated in FIGS. 23 and 24, each spacer 45 may be formed into a shape that is a combination of multiple longitudinal (e.g. rectangular, oval) shapes being apart from each other, and the longitudinal portions may be arranged such that the long axis directions thereof lie along the rubbing direction. Thereby, gaps 45g can be formed between the longitudinal portions along the rubbing direction. Therefore, the tips of the hair of the rubbing cloth are not likely to be disordered by the spacers 45, and a decrease in the alignment force of the alignment film can be suppressed.

Also from the same viewpoint as in Embodiment 1, in the present embodiment, the length X of each spacer 45 in the first direction 7 and the length Y of the spacer 45 in the second direction 8 preferably satisfy the inequalities described in Embodiment 1.

The structures in which the openings of the interlayer insulating film are arranged on a straight line parallel to the column direction have been described above in Embodiments 1 to 3. Here, the direction of the straight line is not particularly limited. For example, the openings may be arranged on a straight line parallel to the row direction.

Although laterally long sub-pixels with a pitch that is greater in the row direction than in the column direction have been described, each sub-pixel may be a longitudinally long sub-pixel with a pitch that is greater in the column direction than in the row direction.

In Embodiments 1 to 3, structures have been described in which linear gate bus lines are arranged in the column direction and linear source bus lines are arranged in the row direction. However, the gate bus lines may be arranged in the row direction, and the source bus lines may be arranged in the column direction. At least one of the gate bus lines and the source bus lines may be bent, for example, zigzagged, in a plan view.

In Embodiments 1 to 3, liquid crystal modes utilizing a common electrode on the counter substrate and an electric field (vertical electric field) generated in the thickness direction of the liquid crystal layer (e.g. twisted nematic (TN) mode and vertical alignment (VA) mode) have been described. Still, the liquid crystal mode of the liquid crystal panel is not particularly limited. For example, the common electrode may be provided to an array substrate, and the liquid crystal mode of the liquid crystal panel may utilize an electric field substantially parallel to the main surfaces of the array substrate (i.e., horizontal electric field) as in the case of the IPS mode and the FFS mode. Furthermore, the liquid crystal mode may utilize an electric field that is generated in the diagonal direction between the array substrate and the counter substrate in a cross-sectional view of the liquid crystal panel (i.e., oblique electric field).

The liquid crystal displays of Embodiments 1 to 3 may be monochrome liquid crystal displays, and each pixel may not be divided into multiple sub-pixels.

In Embodiments 1 to 3, transmissive liquid crystal displays have been described. The liquid crystal panel of each of the liquid crystal displays may be provided with a reflective display portion that provides display by reflecting external light.

The above embodiments may be appropriately combined as long as the combination does not go beyond the scope of the present invention. Also, alternative examples of each embodiment may be combined with the other embodiments.

REFERENCE SIGNS LIST

1: Liquid crystal panel
2: Sub-pixel
3: Liquid crystal layer
4, 5: Optical element
6: Straight line
7: First direction
8: Second direction
10: Array substrate
11: Insulating substrate
12: Base insulating film
13: Gate bus line
14: Source bus line
15: Thin-film transistor (TFT)
16: Semiconductor layer
17: Gate insulating film
18: Gate electrode
19: Source electrode
20: Drain electrode
21: Pixel electrode
22, 23: Interlayer insulating film
24: curved portion
25: Projection portion
34, 35, 36: Opening
40: Counter substrate
41: Insulating substrate
42: Black matrix (BM)
43: Overcoat film
44: Common electrode
45: Spacer
45s: Slit
45g: Gap
46: Region

The invention claimed is:

1. A liquid crystal display comprising:
a first substrate;
a second substrate; and
a liquid crystal layer sandwiched between the first and second substrates,
the first substrate including an interlayer insulating film in which multiple openings are formed on the same straight line,
the interlayer insulating film including multiple curved portions each provided with a curved upper surface,
the curved portions each positioned between two adjacent openings,
the second substrate provided with a spacer facing at least one of the curved portions,
the spacer being longer in a first direction than in a second direction wherein the first direction is a direction parallel to the straight line, and the second direction is orthogonal to the first direction.

2. The liquid crystal display according to claim 1, wherein the spacer is pushed against the N number of consecutive curved portions of the multiple curved portions, wherein N is an integer of 2 or greater.

3. The liquid crystal display according to claim 2, wherein the display satisfies the relation $(N-1) \times L + 2 \times \Delta x \leq X$, wherein X represents a length of the spacer in the first direction, $\Delta x$ represents attachment accuracy of the first substrate and the second substrate in the first direction, and L represents a pitch of the N number of the openings in the first direction.

4. The liquid crystal display according to claim 2, wherein the display satisfies the relation $X \leq (N+1) \times L - 2 \times \Delta x$, wherein X represents a length of the spacer in the first direction, $\Delta x$ represents attachment accuracy of the first substrate and the second substrate in the first direction, and L represents a pitch of the N number of the openings in the first direction.

5. The liquid crystal display according to claim 1,
wherein the spacer is pushed against only one curved portion of the multiple curved portions.

6. The liquid crystal display according to claim 5,
wherein the display satisfies the relation $2\times\Delta x \leq X$, wherein X represents a length of the spacer in the first direction, and $\Delta x$ represents attachment accuracy of the first substrate and the second substrate in the first direction.

7. The liquid crystal display according to claim 5,
wherein the display satisfies the relation $X \leq 2\times L - 2\times \Delta x$, wherein X represents a length of the spacer in the first direction, $\Delta x$ represents attachment accuracy of the first substrate and the second substrate in the first direction, and L represents a pitch of the two openings in the first direction.

8. The liquid crystal display according to claim 1,
wherein the display satisfies the relation $2\times\Delta y \leq Y$, wherein Y represents a length of the spacer in the second direction, and $\Delta y$ represents attachment accuracy of the first substrate and the second substrate in the second direction.

9. The liquid crystal display according to claim 1,
wherein the interlayer insulating film further includes two protruded portions,
the spacer is arranged between the two protruded portions in the second direction, and
the display satisfies the relation $Y \leq M - 2\times\Delta y$, wherein Y represents a length of the spacer in the second direction, M represents a distance in the second direction between two end portions of the two protruded portions facing each other, and $\Delta y$ represents attachment accuracy of the first substrate and the second substrate in the second direction.

10. The liquid crystal display according to claim 1,
wherein the spacer is provided with a flat upper surface, and
the upper surface exhibits a height deviation of 0.05 μm or less.

11. The liquid crystal display according to claim 1,
wherein the spacer in a planar shape has a center and/or a center of gravity on the straight line in a plan view.

12. The liquid crystal display according to claim 1,
wherein the spacer in a planar shape has a center and/or a center of gravity that is/are not on the straight line in a plan view.

13. The liquid crystal display according to claim 1,
wherein in a plan view, the spacer has an n-sided polygonal shape, an oval shape, a circular shape, or a shape that is a combination of multiple shapes.

14. The liquid crystal display according to claim 13,
wherein in a plan view, the spacer has a shape that is a combination of the multiple shapes partially overlapping each other.

15. The liquid crystal display according to claim 13,
wherein in a plan view, the spacer has a shape that is a combination of the multiple shapes being apart from each other.

\* \* \* \* \*